INVENTOR.
Henry Jewett Furber
BY
ATTORNEYS.

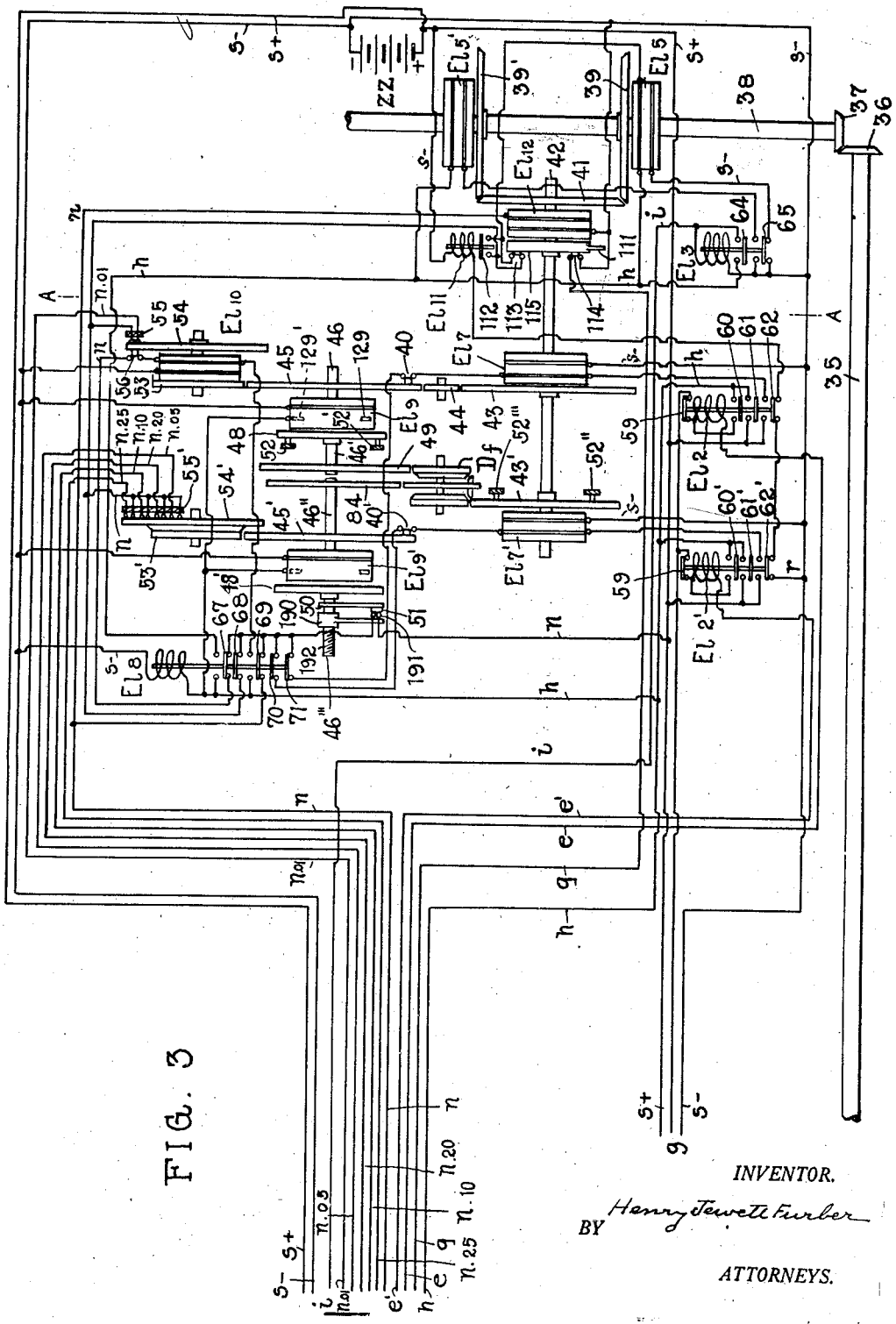

June 15, 1937.  H. J. FURBER  2,083,947
AUTOMATIC SALES SYSTEM
Filed April 27, 1933   9 Sheets-Sheet 4
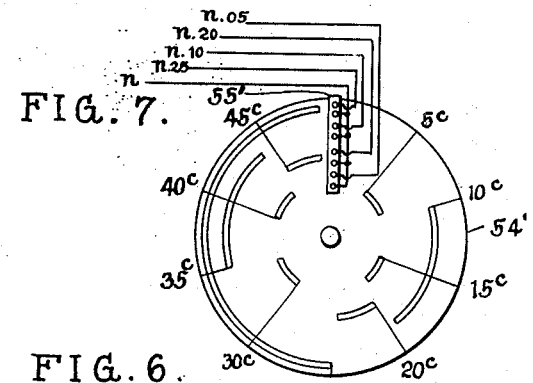
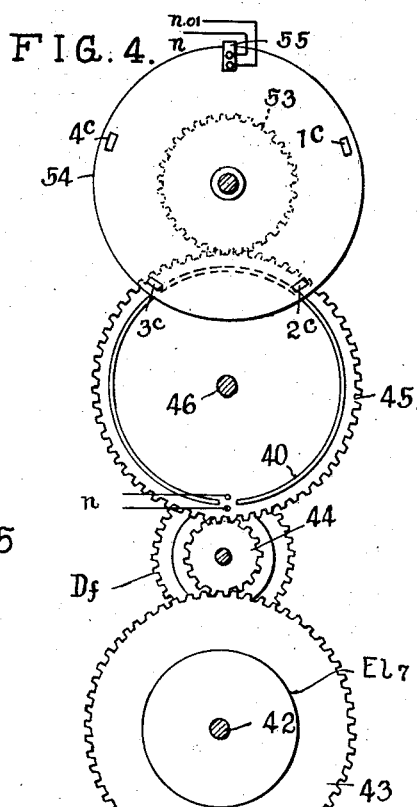
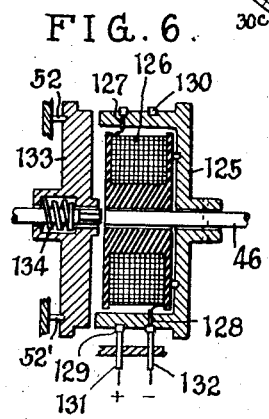
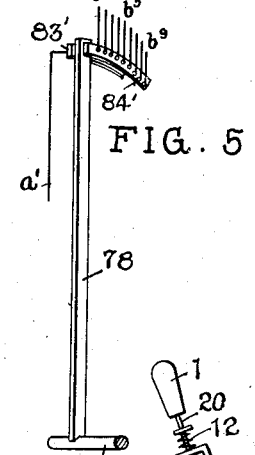
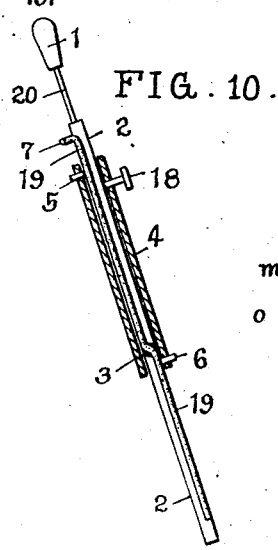
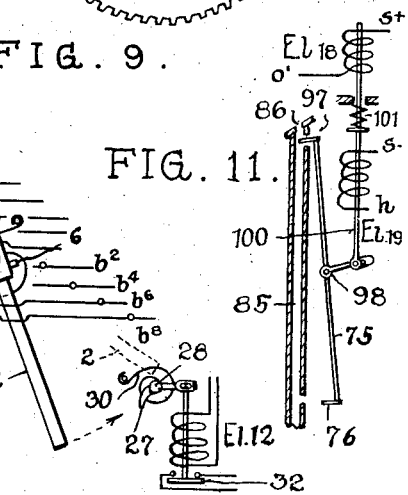
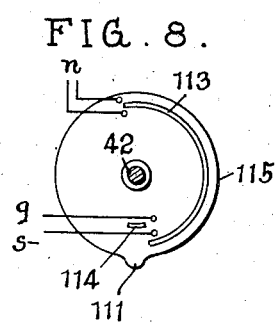
INVENTOR.
Henry Jewett Furber
BY
ATTORNEYS.

June 15, 1937.  H. J. FURBER  2,083,947
AUTOMATIC SALES SYSTEM
Filed April 27, 1933  9 Sheets-Sheet 5

INVENTOR.
Henry Jewett Furber
BY
ATTORNEYS.

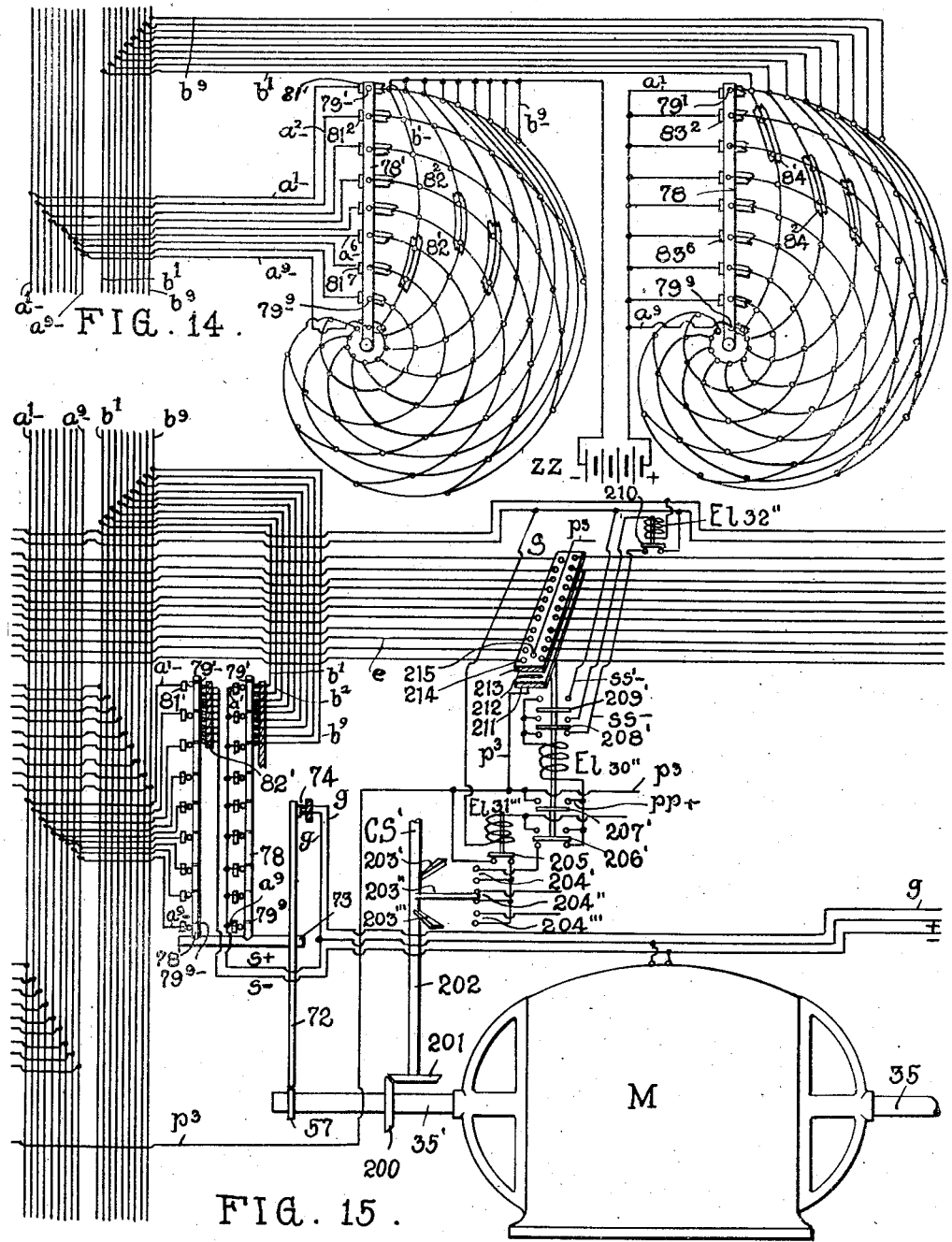

INVENTOR.
Henry Jewett Furber
BY
ATTORNEYS.

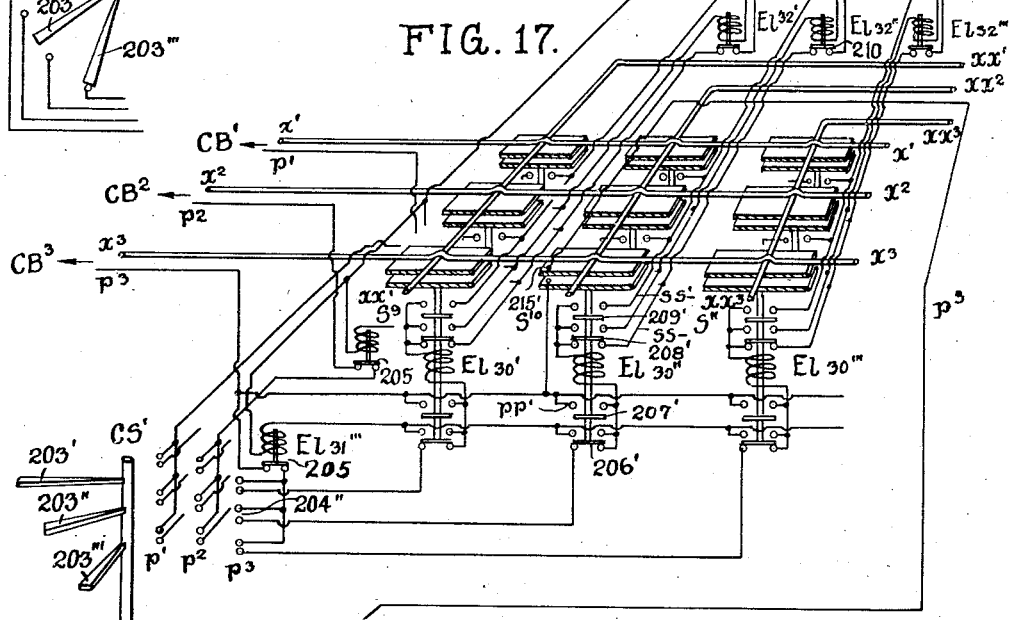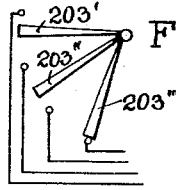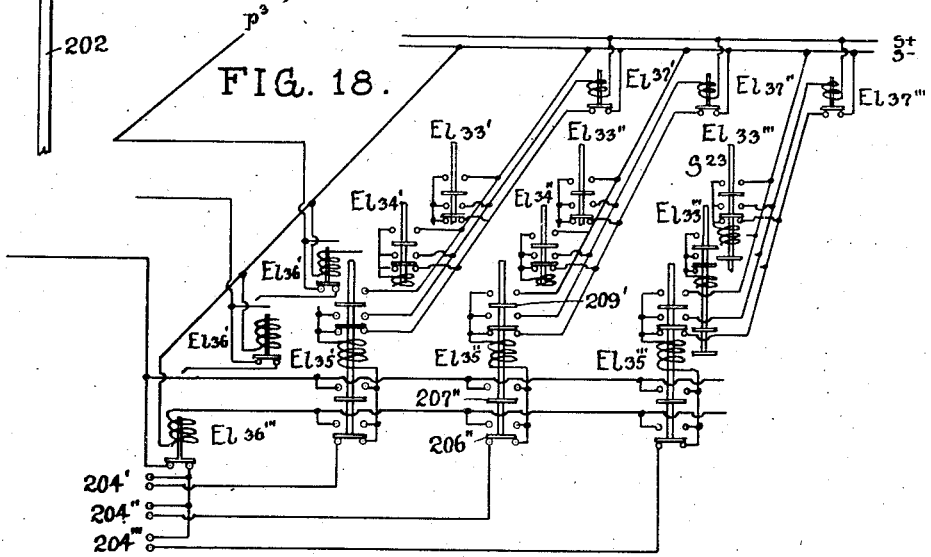

Patented June 15, 1937

2,083,947

UNITED STATES PATENT OFFICE 2,083,947

AUTOMATIC SALES SYSTEM

Henry Jewett Furber, Miami, Fla.

Application April 27, 1933, Serial No. 668,280

32 Claims. (Cl. 194—10)

This invention relates to improvements in an automatic sales system.

An object of the invention is to provide apparatus which may vend an unlimited variety of merchandise at the same or at different prices; which accepts in payment any coin or combination of coins which constitute the price; which permits the vendor to change at volition the price of any or all merchandise on sale; and which will render change, in the event of overpayment, whatever be the price of merchandise and whatever be the excess paid.

Another object of this invention is to provide mechanism which permits a purchaser indefinitely to cumulate his purchases; and make a single payment of their total price.

Another object of the invention is to provide apparatus which permits the purchaser to multiply the amount of merchandise purchased at a single manipulation of the manual controls; and multiplies correspondingly the price which is set up.

Another object of the invention is to provide a system whereby calculating units may be banked at centrals, and be operated by electric current from control boards located at vending stations which may be more or less remote.

Another object of this invention is to provide a selector which permits a lesser number of calculating units to serve a larger number of vending stations or control boards, by automatically closing circuits between any certain control board brought into operation and a calculating unit which may happen to be disengaged.

Operation in general terms

Broadly expressed, my invention comprehends a system wherein at a single store or shop a customer may purchase any one or more of several articles. To each article is assigned a lever or the like for operation by the customers. The proprietor fixes the price of each article and this price is indicated at each vending station. The customer, when he wishes to purchase an article, deposits the amount indicated as the price of the article to be sold and operates the lever or like apparatus. The mechanism automatically delivers the article or articles to be purchased but not until the coin or coins have been received into the machine. The machine automatically returns the change, if any, with the purchased goods. The purchaser cannot change the price of the goods fixed by the proprietor; nor can he receive his goods until the machine automatically deducts from the amount of money deposited the price of the goods. Unless the full price of the goods is deposited the apparatus will not deliver the goods.

A purchaser may purchase several articles of the same goods at one station. The apparatus will automatically add the price of each article and automatically deliver the change from the total amount deposited. If two or more purchasers are operating at the same time, the apparatus is automatically adjusted to allow this and to deliver at each station the proper article purchased and the proper amount of change. These functions are regulated by making and breaking certain circuits which control the mechanism, preferably operated all from a single continuously running motor, important features of the mechanism being electrically operated clutches for connecting the various mechanism with the continuously operated motor. Electrical clutches may be made to clutch and unclutch cleanly and quickly and are largely employed in the transmission.

General description

With the foregoing and other objects in view, as will be developed in the future description of my invention, I will now describe the same in connection with the attached drawings, in which:—

Figure 3 is a diagrammatic view of the calculating mechanism at which the amount of price and payment and the balance of payment over price, if any, are set up, together with mechanism and electrical connections which control the release of change.

Figure 4 is a view from the right, of the calculating mechanism, shown in Figure 3, along the imaginary line A—A.

Figure 5 is a perspective and diagrammatic view from the right showing the arm 78 (Fig. 15) with typical electrical connections.

Figure 6 shows in detail the type of rotary electromagnet which is employed in the transmission disclosed in Figure 3.

Figure 7 is a detailed view of the contact disk 54' (Fig. 3) which controls the release of the five cent, dime and twenty-five cent coins as change.

Figure 8 is a view in detail from the left, of a disk 115 (Fig. 3) operative in restoring elements of the apparatus to zero position, at the close of a transaction.

Figure 9 is a side view with electrical connections, of a purchase lever 1, such as shown in Figure 1.

Figure 1:
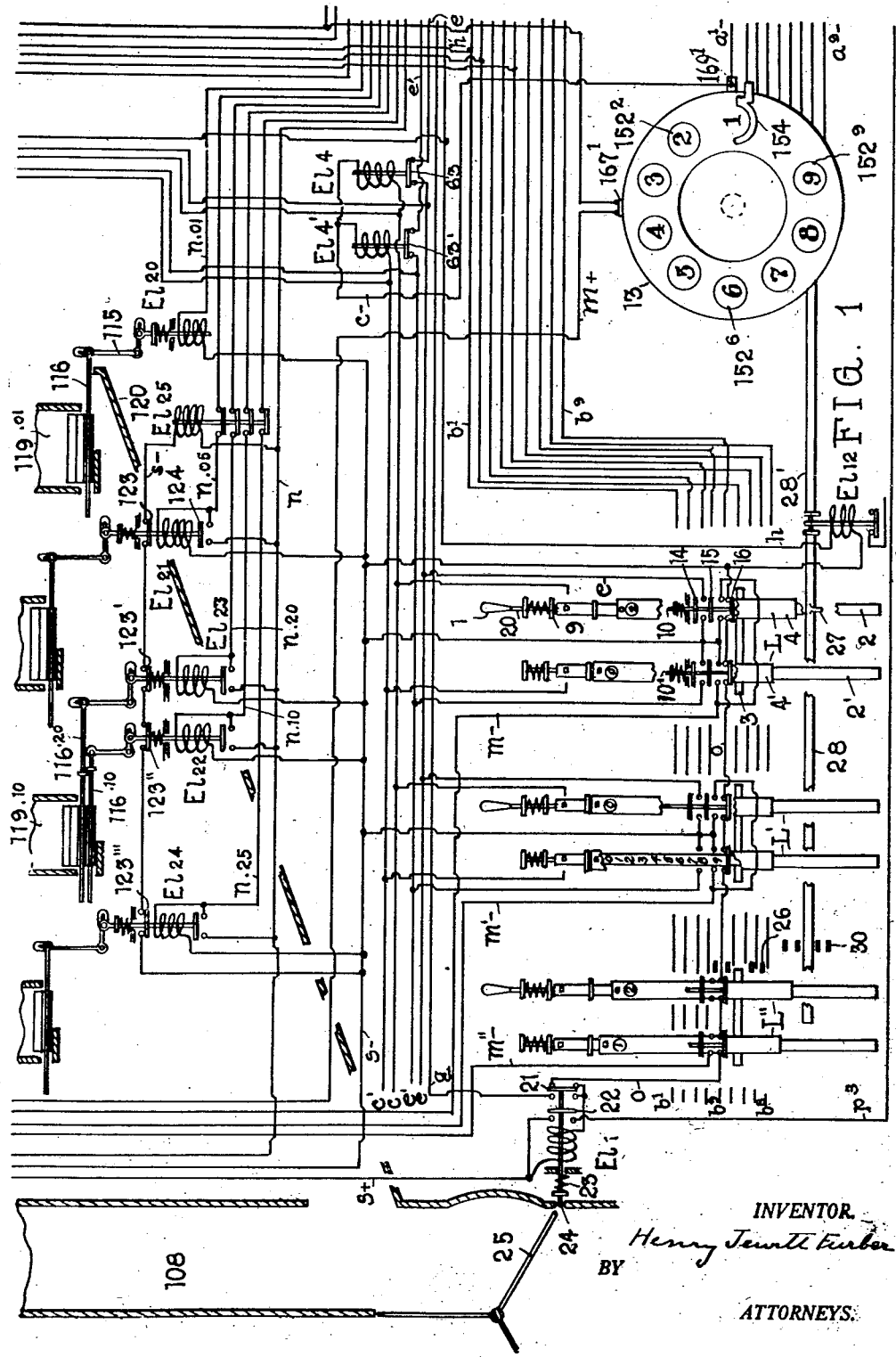
Figure 1 is a diagrammatic view of the lower section of a control board showing purchase levers and electrical connections for the selection of merchandise and the determination of the sales price, together with mechanism for ejecting change.

Figure 10 exposes details of the purchase lever L shown in Figures 1 and 9.

Figure 11 is a view from the right of certain detents which obstruct the passage of tendered coins, until a sale has been effected, and retard their fall until certain circuits are established.

Figure 12:
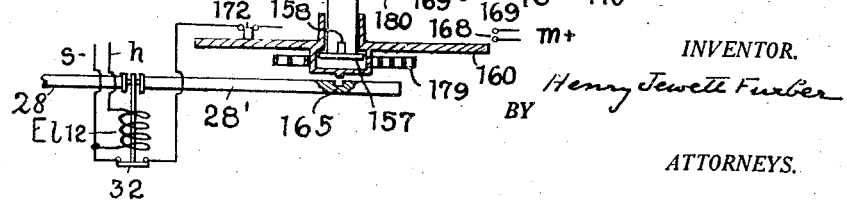

Figure 12 is a sectional view of the disk 13 shown in Figure 1, together with mechanism and electrical connections which it controls, for varying the amount of merchandise released and setting up a corresponding price.

Figure 13:
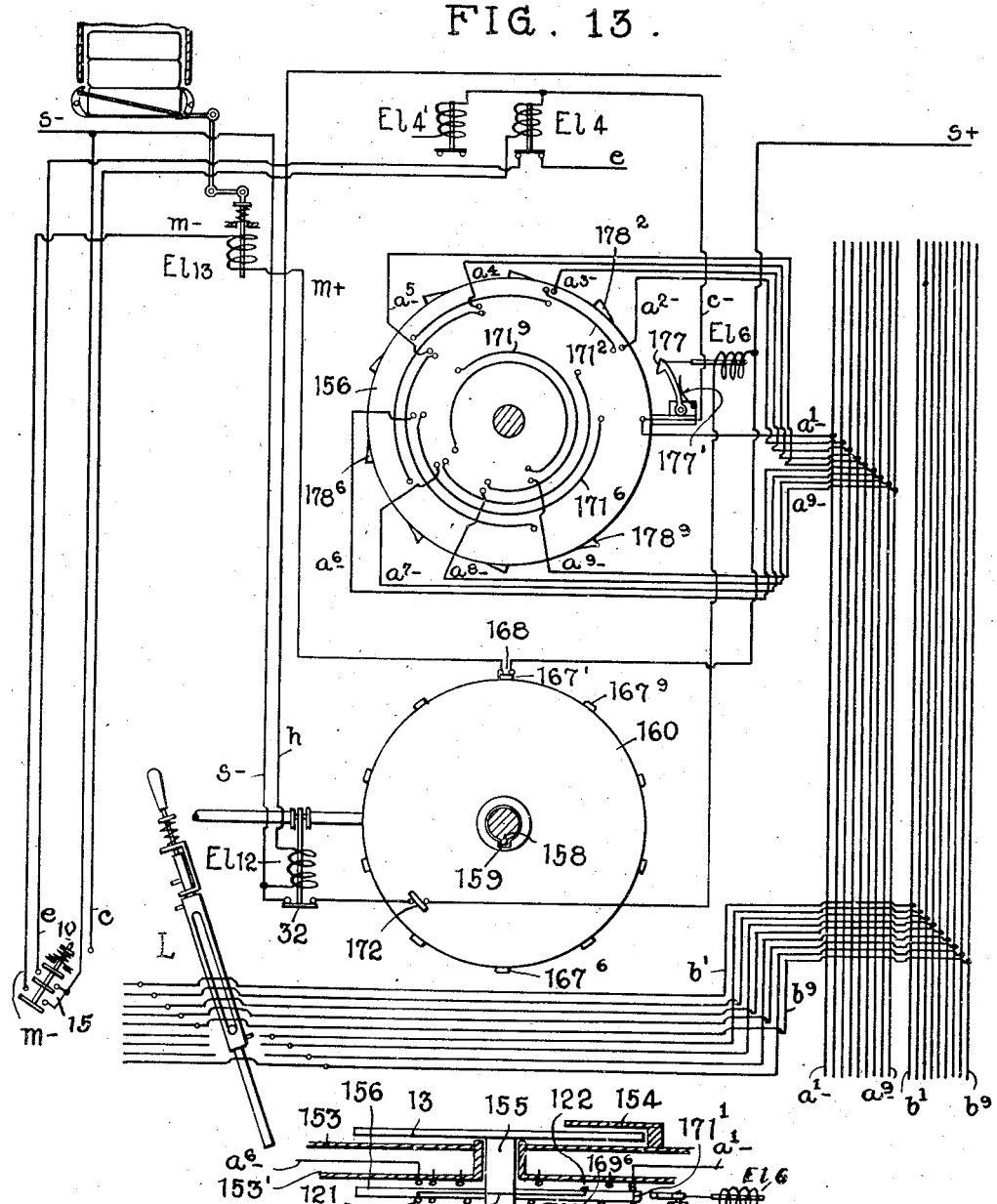

Figure 13 is a diagrammatic view of the circuits closed through the mechanism shown in Figure 12, together with mechanism thereby brought into operation, which may vary the amount of merchandise released and determine the correspondingly augmented price.

Figure 14 is a diagrammatic side view of arms 78, 78' showing the wires and the planetary grouping of the terminals at which they may close circuits in arresting motion at the calculating mechanism of Figure 3, in conformity to a sales price or a tender.

Figure 15 is a view of the electro-motor which transmits motion to the calculating mechanism (Fig. 3) together with the arms 78, 78' and mechanism and electrical connections for operating the switch S of a selector designed to close circuits between a control board (Figs. 1, 2) and a calculating unit (Fig. 3).

Figure 16:
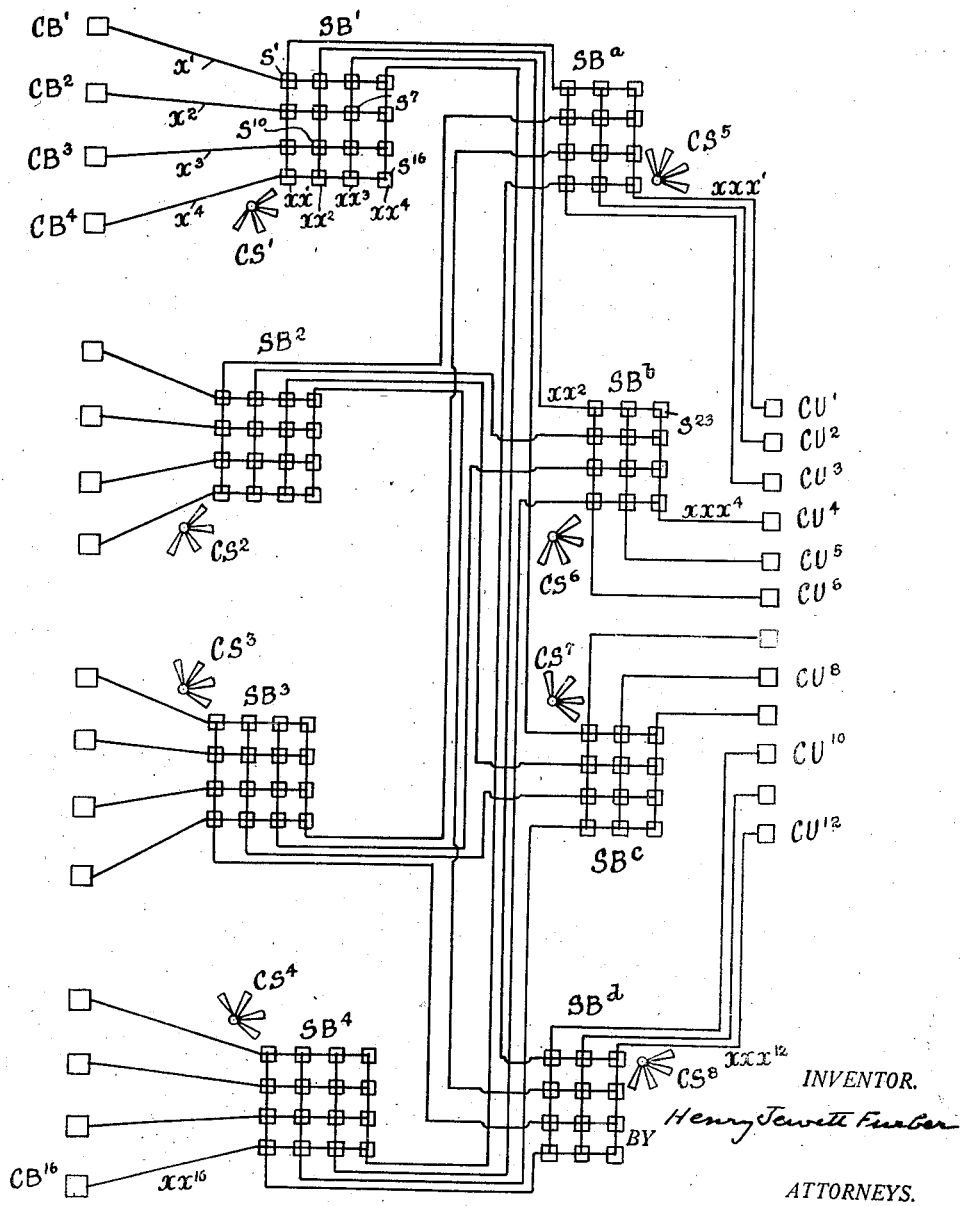

Figure 16 is a diagrammatic plan view of a plurality of control boards and a plurality of calculating units, together with a scheme of wiring through intervening selecting switchboards, which permits circuits to be closed between a control board and a calculating unit which happens to be free.

Figure 17 is a detailed view of a switchboard of the selector with mechanism which prevents a control-board from closing circuits on more than one calculating unit at one time; and prevents two or more control-boards from closing circuits simultaneously on the same calculating unit.

Figure 18 is a detailed view of another switchboard shown in Figure 17, with certain elements removed.

Figure 19 is a plan view of certain rotating contact arms shown in Figures 16, 17, 19, and an arrangement of terminals whereby two circuits can not be closed by the rotating contact arms at exactly the same time.

Figure 20:
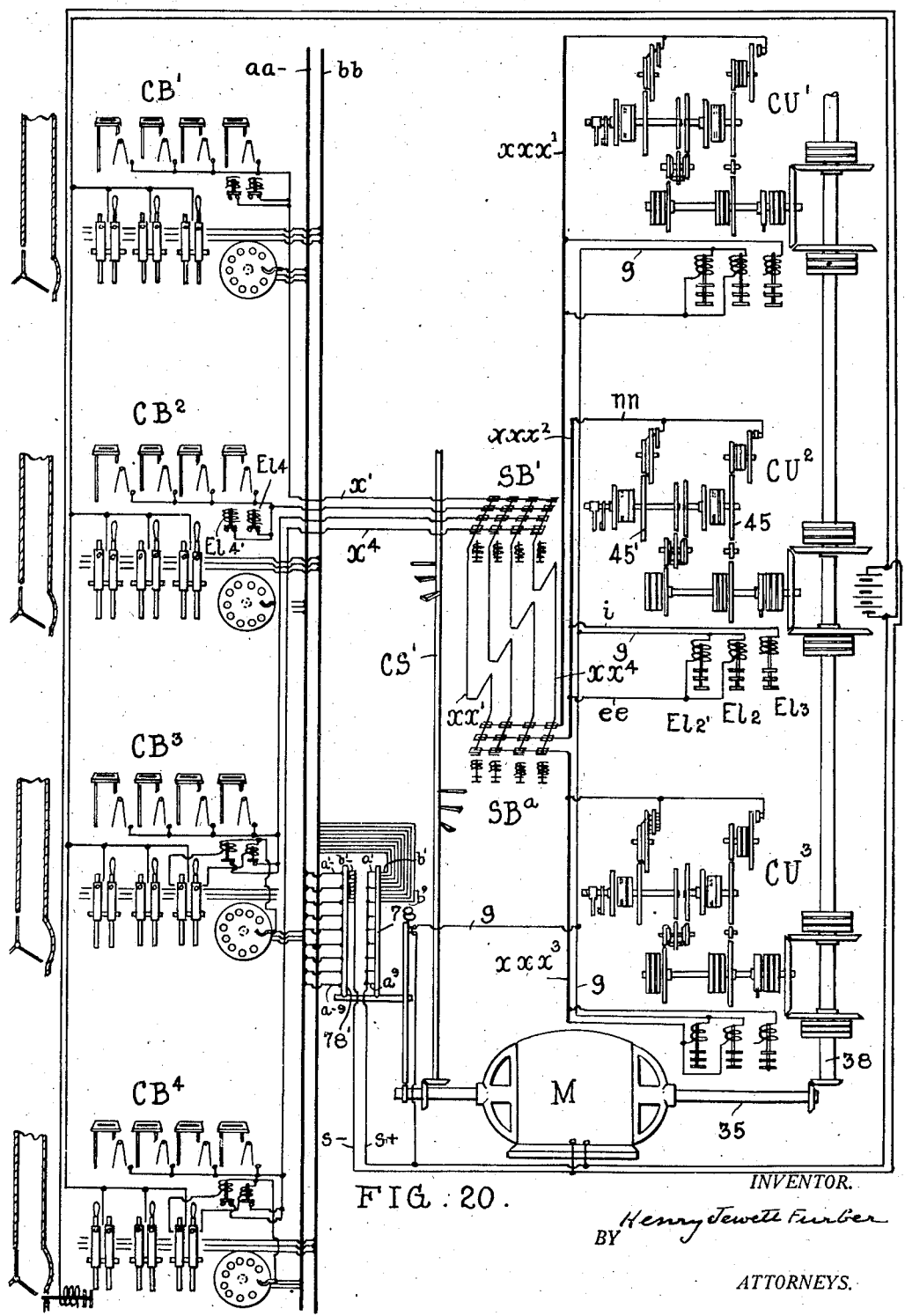

Figure 20 is a view of a selector interposed between four control boards and three calculating units operated by a single motor, showing diagrammatically a general arrangement of the sales system.

Figure 2:
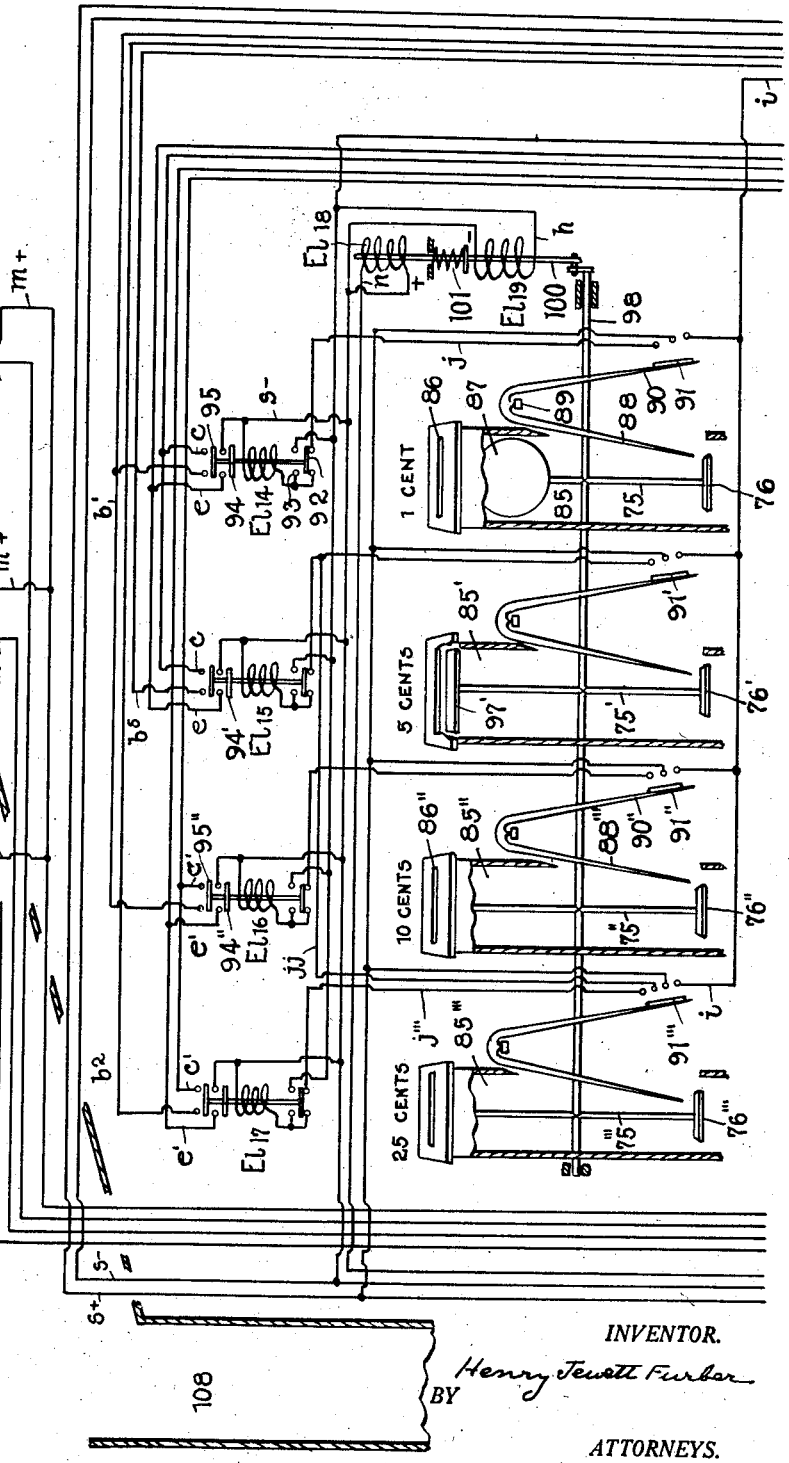
Figure 2 is a view of the upper section of a control board, showing coin receivers with the mechanism and electrical connections which govern the setting up of payment, together with mechanism for the release of merchandise.

Referring to the drawings:—Figures 1 and 2 represent a control board provided with manual sales levers L, L', L'', (Fig. 1) and receivers for the one, five, ten and twenty-five cent coins (Fig. 2). Higher denominations may be employed; and the sales levers (Fig. 1) may indefinitely be increased in number, there being required as many of such sales levers as there be varieties of articles of merchandise for sale. Each sales lever, L, L', L'', comprises one or more bars, such as bars 2, 2', (Figs. 1, 9) fixed to pivot 3. The number of bars common to a sales lever corresponds to ascending decimal columns in the price of goods, and operate respectively on progressive sections (cent, dime, dollar etc.) of a calculating unit (Fig. 3) which will be presently described.

In the present drawings, the sales levers (Fig. 1) are represented with two such bars, 2, 2', on each of which is inscribed a scale of numerals from zero to nine, corresponding to units of value, the left-hand bar 2' at each sales lever representing dimes, and the right-hand bar representing cents. All bars and sales levers are substantially alike. Each bar 2, 2', (Fig. 1) is provided with a sliding sleeve 4, 4', which may be adjusted by the vendor, so as to expose through a perforation in its face, any certain one of the said numerals. The numeral or numerals exposed on the bar or bars at any sales lever, represent and determine the price of the article whose sale may be effected at such sales lever. A thumb screw 18 (Fig. 9) for holding a sleeve in any set position, is provided.

When the price has been established by the vendor, the manipulation of a sales lever L, L', L'' by a purchaser, releases merchandise and sets up its price on what may be called audit wheels 45, 45' of calculating mechanism (Fig. 3), afterwards described, which in present drawings is shown as consisting of two sections corresponding for example to cents and dimes.

Mechanism for setting up a price and releasing merchandise

Bar 2 (Fig. 1) carries a collar 11 (Fig. 9) which at its upper extremity slides upon the spindle 20 and is provided with a projecting foot 9. This collar 11, under tension of a spring 12, rests normally upon the extremity of the sleeve 4. When sleeve 4 is displaced by the vendor in adjusting a price, the collar 11 is pressed down onto the extremity of the bar 2 by spring 12 into such position that the foot 9 is in the pathway of, and may depress a plunger 10, (Figs. 1, 9) against the tension of a spring 17, thereby breaking or closing certain circuits, presently described, at bridges 14, 15, 16. There are only two vertical positions which member 9 can occupy. In raised position it rests on the sleeve 4 and cannot engage the member 10. When the sleeve 4 is displaced in setting up prices, whatever the price may be, the member 9 descends slightly and rests on the extremity of the bar 2. It is then in position to engage the member 10 (Fig. 9) and moves no further than sufficient to engage 10, whatsoever be the displacement of the sleeve 4.

The sleeve 4 (Fig. 9) carries at opposite faces and extremities contacts 5, 6 which, when a sales lever be operated by a purchaser, may close circuit through one of the wires $b^1$ to $b^9$, which wires extend past all sales levers and are exposed to contacts at all sleeves (Fig. 1). The contacts on wires $b^1$ to $b^9$ (Fig. 9) are staggered at opposite sides of bar 2 in order to save space. The contact 5 may operate on contacts of wires $b^1$, $b^3$, $b^5$, $b^7$, $b^9$; and contacts 6 may operate on wires $b^2$, $b^4$, $b^6$, $b^8$. The positions of contacts 5, 6 and of wires $b^1$ to $b^9$ are such, that only one wire of series $b^1$ to $b^9$ may be engaged at any certain sleeve, at the same time; although, as will presently appear, the same or a different wire of series $b^1$, to $b^9$ may be simultaneously engaged at different sleeves of the same sales lever, if the price involves both cents and dimes.

Bar 2 (Fig. 9), as an example, carries fixed thereon, contact 7 which is in the pathway of the terminal of wire $c$; and which is permanently connected with a current conductor 19 extending along bar 2 (Fig. 10) in such manner, that this conductor shall engage the contacts 5, 6, whatsoever be the position of sleeve 4, to the effect that when the sales lever be displaced a circuit is closed between a selected wire of series $b^1$ to $b^9$ and the wire $c$. The $b$ wire or wires selected at sleeves 4, 4' govern the price transmitted in cents and dimes, to the cent section and the dime section of the calculating mechanism (Fig. 3).

Circuits closed at plungers 10, 10' (Fig. 1) lead through wires $e$, $e'$ to what I denominate, for lack of a better term, relays El.2, El.2' (Fig. 3) which provoke movement of the audit wheels 45, 45' (Figs. 3, 4). The wires $b$ selected (Fig. 1) supply current through the wires $c$, $c'$ respectively to the positive poles of the relays El.4, El.4' (Fig. 1) which presently break, at bridges 63, 63', the circuits of the wires $e$, $e'$, deenergizing thereby the relays El.2, El.2' (Fig. 3) and arresting the audit wheels 45, 45' when they have severally reached, as presently described, angles of displacement corresponding to the price.

The sections of calculating mechanism (Fig. 3) corresponding to cents, dimes, dollars, etc. are substantially alike; and each such section is represented by a bar 2, 2' etc. (Fig. 1), at each sales lever, L, L', L'' etc.

The periphery of the audit wheels 45, 45' (Figs. 3, 4) may supposedly be divided into ten equal spaces of 36°, from zero to nine, corresponding respectively to units of value in cents and dimes in conformity to the serial numbers of wires $b$ and the numerals inscribed on bars 2, 2' (Fig. 1).

Movement is communicated to the audit wheels 45, 45', as will further be explained, from motor M (Fig. 15) which is in continued motion, through a series of shafts, wheels and electric clutches (Figs. 15, 3), 35, 36, 37, 38, El.5 or El.5', 39 or 39', 41, 42, El.7, El.7' and thence from El.7 through 43, 44 (Figs. 3, 4) to audit wheel 45 of the cent section, and from El.7' (Fig. 3) through 43', differential Df, 84, 46'', to audit wheel 45' of the dime section. The gearings 53, 53' (Figs. 3, 4) meshing respectively with the audit wheels 45, 45' control, as shall later appear, the release of change.

Depression of the plunger 10 (Figs. 1, 9) by bar 2 at a sales lever (Fig. 1) provokes movement of the audit wheel 45 (Fig. 3). The depression of the plunger 10' (Fig. 1) by bar 2' provokes movement of the audit wheel 45'. The action is similar at all the sales levers.

The moment at which the relays El.4, El.4' (Fig. 1) shall break, at bridges 63, 63', circuit to the relays El.2, El.2' (Fig. 3) is timed by the arms 78, 78' (Figs. 14, 15). These arms 78, 78' (Fig. 15) are pivoted in common upon the shaft 73, and are constantly revolved in unison, say, for example, twenty times a minute, by the motor M, through shaft 35', pinion 57, and wheel 72. The ratio of transmission from shaft 35', to shaft 73, compared with the transmission from shaft 35 to the audit wheels 45, 45' (Fig. 3), is as one to ten. The arms 78, 78' carry, respectively, a series of conductors $79^1$ to $79^9$, $79^1-$ to $79^9-$ (Fig. 14) which may progressively close circuit between numerous pairs of terminals fixed on benches at opposite sides of their several pathways. The position and pathway of arm 78 between two such benches 83', 84' is indicated diagrammatically in Figure 5, as well (Fig. 15). For purposes of momentary illustration, attention may be restricted to the terminals of wire $a^1$, and $b^1$ to $b^9$ carried by the benches 83', 84' (Fig. 5) at which circuits may be closed to the positive poles of the relays El.4, El.4' (Fig. 1), circuits to the negative poles whereof may be simultaneously closed from wires $b^1-$ to $b^9-$ upon wire $a^1-$ through similar terminals on the benches 81', 82', at arm $78^1$ (Figs. 15, 20). In Figure 5 the benches 83', 84' are shown as parallel one to the other. These benches as well as benches 81', 82' may conveniently, however be placed in intersecting positions as shown in Figure 14.

The terminals of wires $b^1$ to $b^9$ (Fig. 5) are so spaced on the bench 84' that the movement of arms 78 to one and then another of said terminals corresponds to a one space or unit displacement of audit wheels 45, 45' (Fig. 3).

The space displacements of the audit wheels 45, 45' at which they shall be severally arrested, coincide, accordingly, with the serial number of the $b$ wire or wires selected at the sales lever (Fig. 1) and with the numerals exposed on bars 2, 2'.

As will subsequently appear, the same relays, through extensions from the same wires $e$, $e'$ (Figs. 1 and 2), perform the same functions, during tender, the motion of audit wheels being then reversed by action of the relay El.3 (Fig. 3). Movement of the audit wheels 45, 45' is clockwise during tender, and in opposite direction during setting up of sales. At the beginning of each transaction the position of the audit wheels 45, 45' is zero, from which position they are displaced in response to sales, and to or through which they are returned by tender. A more detailed disclosure of the operations above described, now follows:—

It being assumed that the price of an article sold, for example, at the sales lever L, be two cents, the vendor leaves the dime sleeve 4' undisturbed and adjusts the cent sleeve 4 (Fig. 1) on right hand bar 2, so that the numeral "2" appears through the perforation in the sleeve, securing the sleeve in such position by thumb screw 18 (Fig. 9). Contact 6 is then in the pathway of the terminal of wire $b^2$; and the collar 11, released by sleeve 4, is pressed down by the spring 12, so that the foot 9 is in the pathway of plunger 10. The vendor's task is then completed.

A customer, in order to purchase the merchandise, setting up as incident thereto, two cents, on audit wheel 45, of calculating mechanism (Fig. 3), may now turn down the sales lever L, (Fig. 1) on its pivot 3, by means of the projecting handle 1 at the extremity of spindle 20. Plunger 10 is thereby depressed by foot 9 and interrupts at bridge 16 a circuit through wire $o$ (Figs. 1, 9) which is so extended that it may be broken by operation of any sales lever (Fig. 1). This deenergizes the relay El.1.

The current of circuit $o$ to relay El.1, so broken, originates at source ZZ (Fig. 3) and passes through wires $s-$ (Figs. 3, 15, 1, 2) and bridges 16 (Fig. 1) at successive sales levers L, L', L'', bridge 21, electro El.1, $s+$, (Figs. 1, 2, 15, 3) back to source ZZ (Fig. 3).

When circuit $o$ is broken at a bridge 16 (Fig. 1) the relay El.1 releases the plunger 24 which is thereupon pressed outward by the spring 23 into such position that it bars movement of a revolving door 25 until this door 25 be finally released by the plunger 24 at completion of purchase, as presently described.

The relay El.1 remains inactive until the purchaser shall have purchased all the merchandise which he desires and shall have paid for all in full.

The sales lever L, when deflected closes at bridge 15 on the plunger 10 (Fig. 1) circuit through wire m— (Figs. 1, 2) to the negative pole of the solenoid El.13 (Fig. 2) which releases the selected merchandise. The circuit so closed originates at the source ZZ (Fig. 3) and passes through wire s— (Figs. 3, 15, 2, 1) bridge 15, wire m— (Figs. 1, 2), solenoid El.13 (Fig. 2), wire m+ (Figs. 2, 1), and normally, through contact plate 167' (Figs. 1, 13) attached to a disk 160 (Fig. 13) presently described, which is superimposed by the disk 13 (Fig. 1). The circuit passes thence through wire s+ (Figs. 1, 15, 3) back to source ZZ (Fig. 3).

The solenoid El.13 (Fig. 2) thus energized retracts its plunger 102 and by a bell-crank lever 103, draw-bar 104 and latch 105, 105' releases a package of merchandise 106. This package 106 now falls upon an inclined slideway 107, whence it descends by gravity through the chute 108 and falls upon the door 25 (Fig. 1) bolted, as above stated, by the plunger 24. In order to prevent fraud, the package 106 is delivered to the purchaser, as later described, only at the termination of the transaction, after tender shall have been fully made.

The price of the merchandise, two cents, is set up on the cent audit wheel 45 (Figs. 3, 4), which is brought into action by circuit to the negative pole of relay El.2, (Fig. 3) closed through wire e at bridge 14 (Fig. 1); and by the positive wire g (Fig. 15, 3), presently described more fully. The circuit so closed originates at source ZZ (Fig. 3) and passes through s+ (Figs. 3, 15), wire g (Figs. 3, 15) contact-plate 74 carried by wheel 72, wire g (Fig. 15, 3) bridge 59, relay El.2, (Fig. 3) wire e (Fig. 3, 15) a multiple switch S, (Fig. 15) wire e (Fig. 15, 1) bridge 14 (Fig. 1) and wire s— (Figs. 1, 2, 1, 15, 3) back to source ZZ (Fig. 3).

Relay El.2 (Fig. 3) is energized only momentarily, through wire g but contracting its plunger is held in stick by current through wire h which, originating at source ZZ, passes through wire s+, bridges 61, 60, on the plunger of the relay El.2, now closed, to the positive pole of relay El.2, the circuit being continued at the negative pole thereof through wire e back to source ZZ, as immediately above described. Interruption of the initial circuit supplied through wire g will be more fully explained later.

Reference has been made to the multiple switch S (Fig. 15). All control wires between control board (Figs. 1, 2) and calculating mechanism (Fig. 3) pass through the switch S. For sake of brevity, accordingly, switch S and Figure 15 will be assumed but not always again be mentioned, in tracing circuits between the control board (Figs. 1, 2) and the calculating mechanism (Fig. 3), until said switch S be later specially described. Circuits are so identified by letters, numbers, and positions, that they may conveniently be traced directly between Figures 1, and 3, without reference to the intervening Figure 15.

Relay El.2 (Fig. 3), energized as above described, through wire g and held in stick through wire h, closes through wire h the circuit to the relay El.8. The purpose of relay El.8 (Fig. 3) is to prevent short circuiting, by closing during sales and tender certain circuits deriving current from the wire h and breaking certain circuits deriving current from a wire n, presently described, and by closing such circuits deriving current from the wire n, and breaking such circuits deriving current from wire h, during eventual restoration of mechanism to zero position and release of change.

Relay El.8 is energized through circuit which originates at source ZZ, and passes through wires s+, bridge 61 at relay El.2, or bridge 61' at relay El.2', wire h, relay El.8, and wire s—, back to source ZZ. Through bridges 67, 69, 70, (Fig. 3) the current passes when relay El.8 contracts its plunger through extensions of positive wire h, which extensions having all a common origin, may severally henceforth be traced from the said bridges. From bridge 67 extends the circuit through wire h, to the electric clutch El.5, whence it passes through the wire s— over bridge 65 depressed at relay El.3, back to source ZZ. Electric clutch El.5, fixed upon the constantly revolving shaft 38, is an electro-magnet of a type (Fig. 6) presently described. Energized as above, the electric clutch El.5 clutches wheel 39 (Fig. 3) floating on shaft 38, and transmits motion through wheel 41 fixed on shaft 42 to electric clutch El.7 fixed likewise on shaft 42. The supply circuit to electric clutch El.7, which is closed by relay El.2 at bridge 62, originates at source ZZ and flows through wires s+ over bridge 62, through electric clutch El.7 and through wire s—, back to source ZZ. The electric clutch El.7 so energized, clutches wheel 43 (Figs. 3, 4) floating on shaft 42, and transmits movement through idler 44 to the audit wheel 45 fixed on shaft 46. All wheels disclosed in this specification are toothed throughout. There are no mutilated gearings.

Electric clutch El.5, El.7, and all other rotatable electros disclosed in present specification, are of the general type represented in Figure 6 which more particularly resembles electric clutch El.9 (Fig. 3) and which consists of a metallic casing 125 (Fig. 6) fixed upon a rotatable shaft such as shaft 46, within which casing 125 is wound a core 126, the poles 127, 128 of which are respectively connected with contact bands 129, 130 encircling in whole or in part the exterior of casing 125, and having contact with terminal brushes 131, 132 of wires + and —. Responsive to the electromagnet and rotated thereby, may be simply a metallic wheel similar to wheels 39 and 43 (Fig. 3) which float rotatably upon their shafts. The responsive member may however be a disk such as disk 133 (Fig. 6), for example, mounted on an hexagonal section of a shaft it is designed to rotate, with detents 52, 52' fixed to some convenient part of the casing, against which disk 133 may be held by spring 134 when not engaged by its electromagnet.

Through the completion of circuits at the plunger of the relay El.2, shaft 42 and audit wheel 45 are set in motion.

The price being two cents, the circuit to the relay El.4 (Fig. 1) which is presently completed through arms 78, 78' (Fig. 15) at the terminal of wire $b^2$ (Figs. 5, 15) and at corresponding terminal of wire $b^2$— at arm 78', originates at source ZZ (Fig. 3) and passes through wires s+, a', (Figs. 3, 15) conductor $79^1$ on arm 78, wire $b^2$, contact 6 on sleeve 4 at lever L (Figs. 1, 9) conductor 19, (Fig. 10) contact 7, wire c+, relay El.4, wire c—, passing normally through terminal 169' (Figs. 1, 12) which is an element in the mechanism superimposed by the disk 13 (Fig. 1) and presently explained, conductor 171' (Fig. 12) wire $a'-$ (Figs. 1, 15) conductor 79'— (Fig. 15) the terminal of wire $b^2$ and thence through wire $s-$ (Figs. 15, 3) back to source ZZ (Fig. 3). The continuity of this circuit appears more simply in Figure 20, presently described, wherein details, and repetition of similar wires are partially suppressed. In Figure 20 the $a-$ wires are represented as entering and carried by the cable $aa-$, the $b$ wires by the cable $bb$, certain $n$ wires by the cable $nn$, and all wires passing between the control-boards $CB^1-CB^4$ and the calculating units $CU^1-CU^3$, as carried in the $x$, $xx$ and $xxx$ cables. When the arms 78, 78' reach the terminal of wires $b^2$, $a^1$, $b^2-$, $a^1-$ and there complete circuit to the relay El.4; this relay El.4 (Fig. 1) contracts its plunger and breaks, at bridge 63, the circuit to relay El.2 (Fig. 3) through wire $e$ which thereupon releases its plunger and breaks, in turn, at bridge 62, circuit to the electric clutch El.7. The electric clutch El.7 thereupon releases wheel 43, and arrests the audit wheel 45 at an angular displacement of two spaces corresponding to the displacement of arms 78, 78', to the index number of the wire $b$, and to the price numeral selected by vendor on bar 2 (Fig. 1).

At bridge 61 (Fig. 3) on the plunger of relay El.2 circuit through wire $h$ is broken, thus de-energizing relay El.8, and electric clutch El.5. Electric clutch El.5 thereupon releases wheel 39, thereby interrupting transmission of motion to shaft 42.

Should the price be higher than nine cents, twelve cents for example, bar 2' at sales lever L, controlling the dime section, (Fig. 1) is then involved. The vendor in such case fixes sleeve 4' on left-hand bar 2' so as to expose the numeral "1" indicative of one dime, and sleeve 4 on the right-hand cent bar 2, as above explained, so as to expose the numeral "2". The right-hand bar 2, when purchase lever is deflected, will now operate upon the calculating mechanism (Fig. 3) exactly as when the price be two cents; and audit wheel 45 of the cent section will be arrested at a displacement of two spaces, as above described. Left-hand bar 2' (Fig. 1) and the circuits thereby closed, operate with similar effect upon audit wheel 45' (Fig. 3) of the dime section, through relays El.2' (Fig. 3) and El.4', (Fig. 1) whose respective circuits are closed through wires $e'$, $c'$ and $c'-$. Relay El.2' when energized, closes circuit through wires $h$ to electric clutch El.5, and relay El.8, in common with the relay El.2.

Deflection of lever L breaks circuit to relay El.1 (Fig. 1), if price be twelve cents, at bars both 2 and 2'; but this is without further effect than when broken, as above described, only at bar 2.

Relay El.2' (Fig. 3) energized through wires $g$ and $e'$ retracts its plunger, and is immediately held in stick through wire $h$ which is closed at bridge 61' and transmits current to relay El.2' through bridges 61', 60'. Wire $h$ carries current to relay El.8, and electric clutch El.5, in manner above explained. At bridge 62' circuit to electric clutch El.7' is now closed. This circuit originates at source ZZ and flows through wire $s+$, bridge 62', $s+$, electric clutch El.7 and through wire $s-$, back to source ZZ. Electric clutch El.7' now energized and rotated through action of electric clutch El.5 clutches wheel 43' floating on shaft 42 and transmits movement through the left lateral and central wheels of differential $Df$, to wheel 84 fixed on shaft 46" and thereby to audit wheel 45' likewise fixed on shaft 46".

If the price be twelve cents, arms 78, 78' revolving, first complete circuit at terminals of wire $a'$ $b'$, $a'-$, $b'-$ (Figs. 11, 15) to relay El.4' (Fig. 1); and arrest audit wheel 45' of dime section at displacement of one space. Electric clutches El.5, El.7, and relay El.8, are all however still energized by wire $h$ through bridge 61 at relay El.2, and audit wheel 45 continues to rotate, until arms 78, 78' complete circuit at terminals of $a^1$, $b^2$, $a^1-$, $b^2-$. These energize relay El.4 which breaks circuit to the relay El.2 and arrests audit wheel 45 of cent section at displacement of two spaces. Relays both El.2 and El.2' having now released their plungers, final interruption of current through wire $h$ is effected to electric clutch El.5, and relay El.8. Wheel 39 is thus released, arresting transmission of motion to shaft 42.

Should the number of dimes in price be greater than the number of cents; relay El.4 will first be energized and relay El.2 first release its plunger. Should the number of cents and dimes in price be equal; circuit to relays El.4 and El.4' will be closed through the same $a-$ and $b$ wires and being energized thereby at the same moment, circuits to relays El.2 and El.2' will simultaneously be broken.

Current through wire $g$, as already stated, immediately on completing circuit to positive poles of relays El.2, El.2', (Fig. 3) is interrupted and relays El.2, El.2' (Fig. 3) are then held in stick through wire $h$. The necessity of immediately breaking circuit through wire $g$ will now appear. For if not so broken, and circuits to relays El.4, El.4' (Fig. 3) were severally closed through different wires $a$, $b$, $a-$, $b-$, through wires $a^1$, $b^1$ and $a^1$, $b^6$ and corresponding negative wires, for example, circuit broken to relay El.2 as arms 78, 78' reach the position of the terminal of $b^1$, would, if wire $g$ be not broken, immediately again be closed, as arms 78, 78' pass onward towards terminal $b^6$. This would cause audit wheel 45 to resume its movement, and falsify the price which it sets up.

This invention contemplates, moreover, as presently explained, the simultaneous operation of a plurality of control-boards and calculating units by means of the same motor and the same arms 78, 78' (Fig. 20). In order, accordingly, that the audit wheels of all calculating units so engaged may correctly reflect the angular displacement of the arms 78, 78', the action of all calculating units is retarded until the moment that the arms 78, 78' begin a revolution, at which instant and only then, circuit through wire $g$ is closed at contact plate 74 (Fig. 15), as presently explained, and initial impulse is imparted simultaneously to the relays El.2, El.2' etc. of all calculating units, on which wires $e$ or $e'$ are closed.

A sales lever (Fig. 1) may be held in deflected position, during operation, by means of a finger 27, (Figs. 1, 9) one such finger being provided at each purchase lever. Each finger 27 is fixed on the shaft 28, to which is attached a shaft crank journaled to the plunger of the solenoid El.12. The solenoid El.12 is in a circuit which originates at source ZZ (Fig. 3) and passes through wire $s+$, bridges 61 or 61' at relays El.3, El.3', wire $h$, (Figs. 3, 1) relay El.12 (Fig. 1) and through wire $s-$ (Figs. 1, 2, 3) back to source ZZ (Fig. 3). Solenoid El.12 (Figs. 1, 9) so energized, as the contact plate 74 (Fig. 15) closes circuit through the wire $g$ to the relays El.2, El.2', retracts its plunger downwards and thereby rotates finger 27 into such position that it engages the lower extremity of bar 2, when the bar be in the dotted position shown in Figure 9. It thus blocks the return of the bar 2 to zero. Similar fingers pass into the pathway of bars 2 at the other sales levers and prevent displacement of such other levers, while the first lever is displaced. The circuit to solenoid El.12 through the wire $h$ being presently broken at bridge 61 (Fig. 3) when relays El.2, El.2' release their plungers, the sales lever (Fig. 1) is restored to zero position by action of the spring 26. Shaft 28, the fingers 27 and the plunger of solenoid El.12, are restored to zero position by the spring 30.

*Mechanism for setting up the payment*

The cost of merchandise, assumed to be two cents, having been set up on audit wheel 45 (Fig. 3), this wheel is now displaced two spaces in direction opposite to clockwise. Let tender of two cents now follow to the effect that audit wheel 45 be turned two spaces back to zero, and the tender balance sale.

Referring to Fig. 2, a series of coin receivers are shown, each comprising a channel, such as channel 85, provided with a slot 86 in which a coin 87 may be inserted. There are four such channels and slots shown in present drawings, which from right to left may correspond to the cent, five cent, dime and twenty-five cent coins. Assuming that the price of merchandise be two cents, the purchaser may, for example, insert a cent coin in the right hand slot 86. The coin descending channel 85 presses against the arm 88 of a pendulous fork pivoted at 89 whose other arm 90 is displaced outwards and closes through a contact plate 91 thereto attached, certain circuits now to be described.

So closed at contact plate 91 (Fig. 2) and in similar manner also by the introduction of the proper coin into any other coin channel, is a circuit through the wire $i$ leading to the positive pole of the relay El.3 (Fig. 3) which shifts circuits at bridge 65 from the negative pole of the electric clutch El.5, to the negative pole of the electric clutch El.5', reversing thereby the movement of audit wheels 45, 45' in response to tender. This circuit originating at source ZZ (Fig. 3) passes through wire $s+$ (Figs. 3, 1, 2), contact plate 91 (Fig. 2) wire $i$ (Figs. 2, 1, 3), relay El.3 (Fig. 3) and wire $s-$, back to source ZZ. The circuit through the wire $i$ is active only as the coin 87 (Fig. 2), for example, in falling, displaces the contact plate 91. Relay El.3 (Fig. 3) retracting its plunger is, however, held in stick through bridge 64, by wire $h$, circuit of which, already described, is closed by the relays El.2, El.2'. The relay El.3 so held in stick, switches, at bridge 65 now raised, current originating at source ZZ and flowing through wire $s-$ to the negative poles of electric clutch El.5', (Fig. 3) whose positive pole is connected with extensions of wire $h$ leading back, as already traced, through wires $s+$, to source ZZ.

The electric clutch El.5' so energized, clutches wheel 39' which transmits, through wheel 41, clockwise motion to shaft 42, and thence, in like direction, to the audit wheel 45, 45'.

Likewise closed momentarily at contact plate 91 is circuit to relay El.14 (Fig. 2). This circuit originating at source ZZ (Fig. 3) passes through wire $s+$, (Figs. 3, 1, 2), contact plate 91, wire $j$, bridge 92, relay El.14, wire $s-$, (Figs. 2, 1, 3) back to source ZZ (Fig. 3). Relay El.14, momentarily so energized, contacts its plunger upwards and is held in stick through contacts 93, closing at bridge 94 the circuit through wire $e$ to the negative pole of relay El.2 (Fig. 3) whose positive pole is supplied by wire $g$ closed momentarily through wire $g$ at contact plate 74, (Fig. 15) and then by wire $h$, as hereintofore described. Circuit is closed to electric clutch El.7 at bridge 62 (Fig. 3). At bridge 95 (Fig. 2) circuit is closed by the relay El.14 between wires $b'$ and $c$. The wire $c$, as hereintofore disclosed, leads to the positive pole of relay El.4 (Fig. 1) and wire $b'$ to its terminal at arm 78, (Fig. 15). To the negative pole of the relay El.4 (Fig. 1) circuit remains closed through wire $c-$ (Fig. 1) terminal 169' (Figs. 1, 12) conductor 171' (Figs. 12, 13), wire $a'-$, (Figs. 1, 15), conductor 79'— (Fig. 15), wire $b^2-$, and wire $s-$ back to source ZZ (Fig. 3). Circuits now being closed at relay El.2 and El.3 (Fig. 3) to electric clutch El.5', El.7 and relay El.8, clockwise movement is imparted to audit wheel 45 through transmission hereintofore described, until arms 78, 78' close circuit at terminals of wires $b^1$, $b^1-$. Circuit then completed to relay El.4, this relay contracts its plunger and breaks circuit of wire $e$ at bridge 63 to relay El.2 (Fig. 3). Audit wheel 45 is thereby arrested at displacement of one space, conforming to the tender of one cent.

Another one cent coin now may be introduced at slot 86 (Fig. 2) and the audit wheel 45 (Fig. 3) be therefore displaced one more space in manner just described. Tender of the two cent price is thus completed, the audit wheel 45 resting now at zero.

If the price be twelve cents, a dime further, may be tendered. The dime is inserted into channel 85'' through slot 86''. The fork 88'', 90'', being thereby deflected, circuit is closed at contact plate 91'' on wire $i$ to the relay El.3 (Fig. 3) in the manner of the cent, and relay El.16 (Fig. 2) is energized and held in stick, closing at bridge 94'' circuit to negative pole of relay El.2' (Fig. 3) through wire $e'$ (Figs. 2, 1, 3), and closing to relay El.4' (Fig. 1) at bridge 95'' (Fig. 2) wire $b^1$ upon $c^1$, circuit to the negative pole of which is closed, in common with the circuit to the negative pole of relay El.4, through the wire $c'-$ as hereintofore described. Relays El.2', El.3, (Fig. 3) being energized, circuits are closed on electric clutches El.5', El.7', and relay El.8, and movement is transmitted to audit wheel 45', through 43, $Df$, 84 as hereintofore described, until arms 78, 78' close circuit to the relay El.4' at terminals of wires $a^1$, $b^1$, $a^1-$, $b^1-$, thus breaking circuit at bridge 63' to relay El.2' and thereby arresting the audit wheel 45' at a displacement of one space corresponding to the tendered dime.

If the price be five cents, and a five cent coin be tendered at the five cent channel 85' (Fig. 2), the operation is similar to that effected by the cent. Circuit is closed at bridge 94' to relay El.2 (Fig. 3) through wire $e$ and to relay El.3 (Fig. 3) through wire $i$. Wire $c$ to the positive pole of the relay El.4 is closed at bridge 95' (Fig. 2) onto wire $b^5$, thereby arresting audit wheel 45 at clockwise displacement of five spaces, conformably to the value of the five cent coin.

A twenty-five cent coin, inserted in its appropriate channel 85''' (Fig. 2) closes at contact plate 91''' circuit through wire $i$ to relay El.3 (Fig. 3); and operates upon both the cent and dime sections of calculating mechanism (Fig. 3). It closes, at contact plate 91'''' circuit through wire $j'''$, to the relay 17 (Fig. 2) which contracting its plunger completes circuit through wire e' to the negative pole of the relay El.2' (Fig. 3) and closes circuit through wires b² and c', to relay El.4', thereby setting up two dimes on audit wheel 45' (Fig. 3) in manner above described. At contact plate 91'''' (Fig. 2) the twenty-five cent coin also closes, through wire jj, circuit to relay El.15 normally operated by the five cent coin. Relay El.15 so brought into operation sets up, in manner above described, five cents on audit wheel 45 (Fig. 3) while the relay El.17 is setting up two dimes on audit wheel 45'.

Mechanism for closing the coin slots

A sale is contemplated before a tender. Otherwire the mechanism would merely return the tender in the form of change. It is necessary, moreover, to maintain the circuits closed at the contact-plates 91, 91', 91'', 91''' (Fig. 2) until circuits be established to the relay El.2 or El.2' by the wire g energized periodically at the contact 74 (Fig. 15) as the arms 78, 78' pass zero. In order to close the coin slots 86, 86', 86'', 86''' (Fig. 2) until a sale is effected, and to keep circuits closed momentarily at contact plates 91, 91', 91'', 91''', a shutter and a detent are provided at each coin channel 85, 85', 85'', 85'''. Pivoted in common to the shaft 98 (Figs. 2, 11) placed horizontally at the rear of the coin channels, within the casing of the control board, are the rods 75, 75', 75'', 75''' each of which carries on its upper extremity a shutter, such as shutter 97', and at its lower extremity a detent, such as 76, 76', 76'', 76'''. The rods, such as 75, 75', oscillated in common, as presently explained, project the shutters and the detents alternately into the pathway of the coins. The shutters pass into the coin channels immediately beneath the coin slots 86, 86', 86'', 86''', thereby obstructing tender, and the detents enter the channels slightly beneath the extremity of the arms 88, 88', 88'', 88''', where they retard the passage of tendered coins at a level which permits the coins to hold the arms 88, 88', 88'', 88''' deflected and circuits at contact plates 91, 91', 91'', 91''' closed.

Fixed to the extremity of the shaft 98 is a crank journaled to the plunger 100 which plunger is common to solenoids both El.18 and El.19. Solenoid El.18 is in a circuit which originates at source ZZ (Fig. 3) and passes through wire s+, (Fig. 3) wire n, contact plate 51, bridge 69 at relay El.8, wire n (Figs. 1, 2), solenoid El.18, and through wire s—, (Figs. 2, 1, 3) back to source ZZ (Fig. 1). Solenoid El.19 (Fig. 2) is in circuit deriving current from wire h hereintofore described, and flowing from solenoid El.19 through wire s—, (Figs. 2, 1, 3) back to source ZZ (Fig. 3). So long as the circuit through wire n (Fig. 1) remains closed, solenoid El.18 is energized and, with its plunger 100 contracted, holds shutters 97 in such position that they close all coin slots. If a sales lever (Fig. 1) be operated, circuit to solenoid El.18 (Fig. 2) is thereby broken at bridge 69 when relay El.8 (Fig. 3) retracts its plunger in manner hereintofore described, and is then broken at arm 50 until the termination of the complete transaction. The plunger 100, is now released by the solenoid El.18, but it is immediately retracted by the solenoid El.19, energized through an extension of the wire h which, as already explained, becomes active when a sales lever be displaced, current flowing through wire s— (Figs. 2, 1, 3) back to source ZZ. Circuit through wire h being broken, when the operation at the sales lever (Fig. 1) is completed and the plunger 100 (Fig. 2) being then freed by the solenoids both El.18, El.19, the spring 101 rotates the shaft 98, oscillating the rods 75, 75', 75'', 75''', and moves the shutters into such position as to permit tender of a coin. The coin 87, for example, passing into the coin channel 85, is arrested by the detent 76, the coin deflecting the arm 88, and holding the circuits at contact plate 91 closed, until circuit be closed at the contact plate 74 (Fig. 15) through the wire g to a relay El.2, (Fig. 3), and the wire h be energized at bridges 61, 61', to the solenoid 19 (Fig. 2). This solenoid El.19 retracting then the plunger 100, oscillates the rods 75, 75', 75'', 75''', releasing thereby the coin retarded at the detent 76 and closing at all the coin channels the shutters such as 97', which remain so closed until the operation be completed and circuit be broken through the wire h. The shutters, such as 97', being again opened by the spring 101, another coin may then be tendered, the operation being repeated until tender equals or exceeds the sales, when, as presently explained, circuit is closed through the wire n to the solenoid El.18 (Fig. 2) which finally contracts the plunger 100 and closes the shutters, such as 97', preparatory to a future sale. Repeated sales may, however, be effected before tender.

If it be assumed that the price of merchandise be twelve cents, and a twenty-five cent coin be paid; thirteen cents are returnable as change. But before describing the operation of change release, the mechanism of intersectional transmission, and in the event of over-payment, the restoration of audit wheels 45, 45' (Fig. 3) to zero, preparatory to a future operation, first should be disclosed.

Mechanism of intersectional transmission

Intersectional transmission, which is from a lower to a higher section only, is effected through the rotation of the disk 48 (Fig. 3) by the electric clutch El.9 which is of type shown in Figure 6. The electric clutch El.9 is fixed on the extremity of shaft 46 (Fig. 3) and the disk 48 on the extremity of the contiguous and disconnected section 46' which is in line with the shaft 46. The electric clutch El.9 is in circuit of the wire h which, passing through electric clutch El.9, is carried through the wire s—, back to source ZZ.

The contact band 129, 129' (Fig. 3), to the positive pole of electric clutch El.9 (Fig. 3) is so mutilated that the electric clutch is energized and rotates the disk 48 in displacements of 18°, only as audit wheel 45 passes through its fifth and tenth spaces, under influence of tender. At each of these fifth and tenth space displacements, the value of five one cent units is transmitted to and totalized at the audit wheel 45' as half a dime, the transmission from the electric clutch El.9 to the audit wheel 45' being through the disk 48, wheel 49, the differential Df, the wheel 84 and shaft 46''.

The position of contact bands 129, 129' on electric clutch El.9 (Fig. 3) being such that, at each fifth and tenth space of angular displacement, they advance audit wheel 45' in clockwise direction, under influence of tender; electric clutch El.9 will at each first and sixth space of angular displacement, clutch the disk 48 and move audit wheel 45' in opposite direction, in setting up a price. It is obvious that the initial reverse movement of the audit wheel at any section would be transmitted onwards to all higher sections, howsoever numerous they possibly might be. Utilizing this principle, a denuded section is provided, consisting only of an arm 50 and a disk 48' to which motion is transmitted by electric clutch El.9, in manner of the electric clutch El.9 described. The arm 50 is virtually a limited substitute for an audit wheel corresponding to the dollar. The positive contact band on the electric clutch El.9' is mutilated through the same arcs, as is the positive contact-band on the electric clutch El.9, and transmission to the arm 50 from the next lower section, is at the same intervals as between the sections therebelow.

The arm 50 carries a contact plate 51 which breaks circuit on wire n, at terminals 191 at the first space displacement of arm 50 in any section consequent on sale, and arm 50 is returned to zero and closes circuit on wire n at terminals 191, only when tender has been completed equal to the price. The contact plate 51 when rotated can never pass through zero under influence of tender; but sales may be indefinitely cumulated, and the contact plate 51 pass through zero, in opposite direction on completion of a revolution, as will be presently explained. The arm 50 cannot pass through zero under influence of tender, because it is advanced a half space only, by a five space displacement at the section next below; whereas there is a coin of no denomination operative on such lower section, which is sufficiently large, to move arm 50 back to zero and beyond. The tweny-five cent coin, for example, which displaces audit wheel 45', only two and a half spaces, is the highest coin which operates directly upon the section of the dime. Should the apparatus comprise a dollar section, the fifty cent coin would operate upon the section of the dime. But the arm 50 would then be placed above the dollar section; and the $2.50 coin being the highest operative denomination, again would be insufficient to carry the arm 50 above zero.

*Mechanism for restoring elements to zero position*

At the first and every contraction of a plunger by the relays El.2, El.2' (Fig. 3) a circuit through wire r is broken at bridge 62, 62' to relay El.11. This circuit originating at source ZZ passes through wire s—, bridges 62', 62, relay El.11, and wire s+, back to source ZZ. Relay El.11 so deenergized releases its plunger and closes at bridge 112 circuit to electric clutch El.5 through an extension of wire n, which is however forthwith broken at bridge 68 and at arm 50. Circuit to relay El.11 may presently be closed at bridges 62, 62'; but this relay El.11 is of magnetic energy sufficient, when energized, only to retain its plunger, but not sufficient to contract it. Circuit through wire n to electric clutch El.5 as yet inactive, remains broken at arm 50 while closed at bridge 112 preparatory to a final operation after tender be completed.

When completion of tender has restored arm 50 to zero, closing circuit on the wire n at terminals 191 through contact plate 51, and has further permitted relay El.8 to release its plunger and close circuit on the extensions of wire n at bridges 67, 68, 69, 70, 71; electric clutch El.5, whose negative pole is connected through wire s— over bridge 65 depressed to source ZZ, again transmits motion to the shaft 42, which carries fixed thereon the electric clutch El.12. Electric clutch El.12 is in circuit extended through wire n from bridge 69, which passing through electric clutch El.12, returns through wire s—, to source ZZ. Electric clutch El.12 so energized clutches and revolves disk 115 on which is fixed the cam 111. Rotation of disk 115 causes the cam 111 to carry the plunger of relay El.11 upwards to zero position where it is retained by the relay El.11. This breaks circuit to relay El.5 at bridge 112; but not before the same n circuit has been closed to electric clutch El. 5 through contact plate 113, (Figs. 3, 8) on the face of disk 115. Rotation of shaft 42 and disk 115 is thus continued until, at the termination of a single revolution, circuit to electric clutch El.5 (Fig. 3) is broken at contact plate 113 (Figs. 3, 8). Immediately before disk 115 completes its revolution, the contact plate 114 momentarily completes circuit to relay El.1 (Fig. 1) through the wire q (Figs. 3, 1) closed at bridge 21 on plunger of relay El.1 (Fig. 1). This circuit originating at source ZZ (Fig. 3) passes through wire s—, contact 114, wire q, (Figs. 3, 1) bridge 21 (Fig. 1), relay El.1 wire s+, (Figs. 1, 2, 1, 3) back to source ZZ (Fig. 3). Relay El.1, Fig. 1) momentarily so energized contracts its plunger and is held in stick through circuit of wire o which since no sales lever is deflected, is now closed. Contraction of plunger 24 by relay El.1 releases the revolving door 25, and transaction is completed by the delivery thereby to purchaser, of the merchandise hitherto detained, and change, if any, presently described.

The electric clutches El.7, El.7' (Fig. 3) are again operative in finally restoring the audit wheels 45, 45' to zero, if the audit wheels be displaced through excess tender at the termination of a transaction. The electric clutches El.7, El.7' are then respectively energized by circuits which pass from bridges 70, 71, through wires n and contact plates 40, 40' (Figs. 3, 4) to electric clutches El.7, El.7' and thence through wire s— back to source ZZ (Fig. 3). The contact plates 40, 40' are similar in type. That carried by the audit wheel 45 is shown in Figure 4. They are carried respectively on a face of each audit wheel 45, 45', and extend throughout the circumferences thereof save at a slight arc, at which, if payment exactly equal price and the audit wheels 45, 45' (Fig. 3) already are at zero position, circuit to the electric clutches El.7, El.7' is broken. If under the influence of overpayment an audit wheel 45, 45' has passed through zero, the electric clutches El.7 or El.7', one or both, are energized and rotate the audit wheels 45, 45' or both thereof back to zero, where they are severally arrested as circuit be broken at contact plates 40, 40'.

During restoration of the calculating unit to zero position, intersectional transmission is suppressed, the electric clutches El.9, El.9' being then inactive.

*Mechanism of change release*

Returning to the assumption that the price be twelve cents and the payment twenty-five cents: The wheel 53 (Fig. 3) in mesh with audit wheel 45 rotates the electric clutch El.10 which is energized during all price setting and payment operations, through a wire h extended from bridge 69 at relay El.8, current passing from the relay El.10 through wire s—, back to source ZZ. So energized, electric clutch El.10 clutches and rotates disk 54, which carries contact plates 1¢, 2¢, 3¢, 4¢, (Fig. 4) corresponding collectively to the maximum number of cent coins required as change, if change be made in highest possible denominations.

Disk 54 (Figs. 1, 4) is revolved twice through multiplication in transmission by each single revolution of audit wheel 45; for the same number of cent coins are returnable as change, at six to nine cents over-payment, as at one to four.

If the price be twelve cents, disk 54 is revolved in setting up of price, two spaces in clockwise direction, to the effect that the contact plate 3¢ (Fig. 4) carried by disk 54 is opposite bench 55. The payment of a twenty-five cent coin rotates disk 54 in response to the five cent element therein, an entire revolution in opposite direction; and contact plate 3¢, again opposite bench 55, completes a circuit extended through wire $n$ from bridge 69 leading through wire $n.01$ (Figs. 3, 1) to solenoid El.20 (Fig. 1) whence it returns through wire $s-$, (Figs. 1, 2, 3) back to source ZZ. Solenoid El.20 (Fig. 1) so energized retracts its plunger downwards, and through bell-crank 115 displaces a slide 116 (Fig. 1) so perforated, that it embraces and dislodges the bottom cent coin of a coin column, from the container 119.$^{01}$. The coin falls upon the inclined slide-way 120 whence it descends by gravity through channel 108 upon the door 25 (Fig. 1) and is finally delivered to the purchaser with the purchased merchandise.

During restoration to zero and release of change, a circuit is closed through an extension of wire $n$ from bridge 67 at relay El.8 (Fig. 3) through contact plate 56 on the face of disk 54 (Fig. 3) to electric clutch El.10 (Fig. 1) and thence through wire $s-$, to source ZZ. This contact-plate is exactly similar to the contact plate 40 shown on the audit wheel 45 (Fig. 4). Rotated back to zero by electric clutch El.10, so energized, during restoration, disk 54 successively closes, through contact plates 2¢, 1¢, (Figs. 3, 4) circuit to solenoid El.20 (Fig. 1), which thereupon releases two more cent coins as change. Circuit through wire $n$ to the electric clutch El.10 is broken at contact plate 56, as disk 54 reaches zero; and movement of the disk is thereby arrested.

Three cents having been released, a dime is required to complete the thirteen cents returnable as change.

Simplification can conveniently be introduced in the release of denominations higher than the cent. Since the number of higher coins required in making change is smaller, one five cent coin only is so employed; two dimes; and one twenty-five cent coin, if the fifty cent coin then enter change.

In mesh with audit wheel 45' (Fig. 3) is the wheel 53' integral with the disk 54', which is revolved twice by each single revolution of the audit wheel 45', the order of coins released being recurrent of each successive half revolution of audit wheel 45'.

Disk 54' (Figs. 3, 7) is provided with contact plates in concentric series 5ᶜ, 20ᶜ, 10ᶜ, 25ᶜ, capable respectively of closing circuits at bench 55' through wires $n.05$, $n.20$, $n.10$, $n.25$, to solenoids El.21, (Fig. 1) El.23, El.22, El.24 which release respectively as change, the five cent, dime, two dimes and twenty-five cent coins. Higher sections substantially similar to the section of the dime, may be added to the apparatus, such as the section of the dollar, which would release the fifty cent, the dollar and the two-dollar fifty denominations; and the section of the ten dollar, which would release the five dollar, the ten dollar and the twenty dollar coins.

As above explained, the audit wheel 45' of the dime section, in setting up a price, is displaced 18° at each first and sixth space displacement of the cent audit wheel 45. The audit wheel 45', assuming the price to be twelve cents, is displaced 36° further in setting up the dime. This leaves the audit wheel 45' at a total angular displacement of 54°; and as the transmission from audit wheel 45' to the disk 54' is in the ratio of one to two, the disk 54' is accordingly displaced 108°, exposing to the bench 55' the contact plates along the imaginary line marked 35ᶜ (Fig. 7). Upon tender, as assumed, of a twenty-five cent coin, disk 54' is rotated one space in opposite direction by movement transmitted from the cent section, and four spaces by movement originating in the section of the dime. Disk 54' now closes at bench 55' circuit at the contact plate along the imaginary line marked 10ᶜ, through wire $n.10$ to solenoid El.22 (Fig. 1). The circuit so closed originates at source ZZ (Fig. 3) and is completed through wires $s+$ $n$, contact plate along line 10ᶜ on disk 54 (Fig. 7), wire $n.10$ (Figs. 3, 1), a bridge at the relay El.25 (Fig. 1) to the solenoid El.22, and thence through wire $s-$, (Figs. 1, 3) back to source ZZ (Fig. 3). Solenoid El.22 (Fig. 1) so energized, retracts its plunger downwards and releases the required dime as change.

Should excess payment require a five cent coin as an element in change, a contact plate of innermost series on disk 54' (Fig. 7) will finally close, at bench 55', a circuit through wire $n.05$ to the solenoid El.21 (Fig. 1) which will in similar manner liberate the required five cent coin.

The operation of solenoid El.24 (Fig. 1) circuit to which may be closed at the contact plate originating at line 25ᶜ through wire $n.25$ at bench 55', is exactly similar, in releasing a twenty-five cent coin.

Should excess payment require twenty cents as element in change, circuit will similarly be closed at bench 55' by contact plates of series originating at line 20ᶜ through wire $n.20$, to solenoid El.23 (Fig. 1) which displacing slide 116.$^{20}$ dislodges the next to bottom coin from the container 119.$^{10}$, and at the same time, by means of a lug fixed to slide 116$^{20}$ which bears against a lug fixed to slide 116.$^{10}$, displaces the slide 116.$^{10}$ and releases from container 119.$^{10}$ the bottom coin as well.

Should the change involve coins of different denominations, as for example, were forty cents change required; (assuming tender through the addition of a higher section,); the contact plates on disk 54' (Fig. 7) along line 40ᶜ will close circuits on solenoids El.21, El.22, El.24 (Fig. 1); and these solenoids operating simultaneously will return a five cent, a dime and a twenty-five cent coin.

When a solenoid El.21, El.22, El.23, El.24, (Fig. 1) as for example solenoid El.21, contracts its plunger and releases change, it is held in stick by circuit closed at bridge 124, and is thereby prevented from repeating its action, as disk 54' (Figs. 3, 7) passing to zero position, may again close circuit to solenoid El.21 (Fig. 1) at further contact-plates which may be progressively exposed (Fig. 7). The circuit by which solenoid El.21 (Fig. 1) is thus held in stick, extends from bridge 69 at relay El.8 (Fig. 3) through wire $n$ (Figs. 3, 1) bridge 124, (Fig. 1) solenoid El.21, and through wire $s-$ (Figs. 1, 3) back to source ZZ (Fig. 3).

In order similarly to prevent completion of circuit, through further contact plates on the disk 54' (Fig. 7), to solenoids (Fig. 1) not involved in releasing the necessary change and which are consequently not so held in stick, the relay El.25, is provided, through the bridges at which pass the circuits of wires $n.^{05}$, $n.^{20}$, $n.^{10}$, $n.^{25}$, which supply, respectively, initial impulse to the solenoids El.21, El.22, El.23, El.24. The relay El.25 is in a circuit extended from bridge 69 at relay El.8 (Fig. 3) which passes through wire $n$ (Figs. 3, 1) relay El.25 (Fig. 1) wire $s-$ (Figs. 1, 3) over bridges 123, 123', 123'', 123''' (Fig. 1) back to source ZZ (Fig. 3). The moment any one of the solenoids El.21, El.22, El.23, El.24 (Fig. 1) contracts its plunger, circuit is broken at bridge 123, 123', 123'' or 123''' to the relay El.25, which, releasing its plunger and breaking initial circuits, immobilizes the remaining solenoids El.21, El.22, El.23, or El.24.

*Mechanism for multiplying the value of merchandise released*

In order to effect the operation now proposed, a rotatable disk 13 (Figs. 1, 13) is installed at the control board, with orifices such as $152^2$—$152^6$—$152^9$ superimposing a series of numerals from "2" to "9" inscribed upon a stationary plate 153 (Fig. 12). A purchaser desiring only a single package of merchandise need manipulate, for reasons presently described, only the sales lever. Should he desire two or more such packages—six for example—he rotates manually, before manipulation of the sales lever (Fig. 1), the disk 13 so that the orifice $152^6$ shall be arrested at the stop 154.

Disk 13 is fixed to a shaft 155 (Fig. 12) which carries, attached thereto, a disk 156 (Fig. 12, 13) and also at its lower extremity a flange 157 on which is mounted a key 158 (Figs. 12, 13) capable of engaging the notch 159 (Fig. 13) near the axis of the disk 160 which floats on shaft 155 suspended normally on the flange 157. The disk 156 fixed on shaft 155 constantly rotates with disk 13; and the disk 160 participates in the displacement of disk 13 and 156 when a purchaser manipulates the disk 13.

As presently described, the position of disk 160 governs the number of packages which shall be released at a single manipulation of a sales lever; and the position of disk 156, determines the angular displacement at which arms 78, 78' (Fig. 15) shall close circuits to relays El.4, El.4' (Fig. 1) and thereby arrest movement of audit wheels 45, 45' (Fig. 3) in conformity to price.

The plunger of the solenoid El.12a (Figs. 1, 12, 13) journaled to shaft 28 (Figs. 1, 13) is journaled also to the extension thereof, shaft 28', which carries a cam 165 (Fig. 12) placed immediately beneath the depressed centre of disk 160. When the solenoid El.12a rotates shafts 28, 28', at beginning of a sale, as hereinbefore described, cam 165 so raises disk 160 upon the perpendicular shaft 155 that the notch 159 in disk 160 (Fig. 13) escapes the key 158 on the flange 157 (Fig. 12) and permits the disk 160 to rotate back to zero, pivoting on the cam 165, under action of the spring 179 (Fig. 12).

Fixed to the periphery of disk 160 (Fig. 12) are a series of contact plates $167^1$ to $167^9$ (Fig. 13) designed, as disk 160 returns to zero, sucessively to close circuit to the positive poles of the solenoids El.13, El.13' or El.13'' (Figs. 2, 13) at terminals 168 of wire $m+$ and to release at each impulse a package of the merchandise selected at the levers L, L', L'' (Fig. 1).

The circuit closed to the solenoid El.13 (Fig. 2), for example, when a purchaser desires a single package, and disk 13 (Figs. 11, 12) as above stated, is not displaced, has been already traced.

The terminals at which circuit may be closed at arms 78, 78' (Figs. 14, 15) to the relays El.4, El.4' are grouped in planetary and in relatively like position about each of these two arms. At one face of the pathway of arm 78 are the terminals of the positive wires $b^1$ to $b^9$, which wires are shown as emerging vertically from the orbit of the arm 78, and advancing towards its axis in the form of spirals. At the other face of the pathway of arm 78 the wires $a^1$ to $a^9$ connected with the positive pole of the source ZZ through wire $s+$ intersect the wires $b^1$ to $b^9$, being mounted on concentric benches at progressive distances from the axis of arm 78, the terminals of the wire $a^1$ being the most distant from this axis, and the terminals of the wire $a^9$ the least remote. At each intersection of wires $a$ and $b$, are terminals between which arm 78 revolving closes, at progressive intervals, through conductors $79^1$ to $79^9$, the several wires $a$ upon the several wires $b$, which several wires $b$ serve as positive wires to either or both the relays El.4, El.4', at any and all control boards CB$^1$—CB$^4$ (Fig. 20).

The arm 78' is similar to arm 78, and the terminals thereat are similarly grouped, the wires at the arm 78', being negative. At arm 78' wires $b^1-$, $b-^9$ are closed onto wires $a^1-$, $a^9-$ in manner similar to that last above described. The spiral wires $b^1-$, to $b^9-$ are connected with the source ZZ (Fig. 3) through the wire $s-$ and the wires $a^1-$ to $a^9-$ emerging horizontally from their circular benches, serve as negative wires to relays both El.4 and El.4', at any and all controlboards (Fig. 20).

An indefinite number of control-boards may simultaneously draw current from the same $a-$, $b-$ and $a$, $b$ wires.

Let it now be assumed that the price of merchandise established by vendor at sales lever L (Figs. 1, 13), for example, be three cents, and the number of packages desired, six. Purchaser rotates disk 13, (Fig. 1) so that the orifice $152^6$ is moved to stop 154. This displaces the disk 160 (Figs. 12, 13) so that contact plate $167^6$ (Fig. 13) on disk 160 is exposed to terminals 168; and the disk 156, so that a latch 177, responsive to the spring 177' may engage the pawl $178^6$. This latch 177 is pivoted at a convenient portion of the casing and is attached to the plunger of the solenoid El.6, normally contracted. The circuit to the solenoid El.6 is, however, broken at contact plate 172 when disk 160 be displaced, and this permits the latch 177 to descend upon the pawls $178^2$—$178^9$.

The purchaser next deflects the sales lever L (Figs. 1, 13) and, the price being three cents, the wire $b^3$ closes on wire $c$. Circuit through the wire $h$ becoming immediately active, solenoid El.12 contracts its plunger downwards and rotating shafts 28, 28' raises disk 160 through action of cam 165 (Fig. 13) so that the notch 159 escapes key 158 (Figs. 12, 13). Circuit being completed at levers L and at terminals 168 to the solenoid El.13, a package of merchandise is released. As disk 160 returns to zero under tension of spring 179 (Figs. 12, 13) contact plates $167^5$, $167^4$, $167^3$, $167^2$, $167^1$ (Fig. 13) successively close circuit at terminals 168, and five more packages are released.

Disk 156 is meanwhile detained by latch 177.

At bench 170, (Fig. 12) wire c— is extended to nine terminals 169¹—169⁹ capable respectively, according to the position of the disk 156, of closing circuit at terminals of negative wires $a^1$— to $a^9$—, through conductors 171¹, to 171⁹ (Figs. 12, 13) transversing the disk 156. If, assuming that the number of desired packages be six, and disks 13, 156 be correspondingly displaced, the lower terminal 121 of conductor 171⁶ will close on terminal 169⁶ at bench 170 (Fig. 12) and the upper terminal 122 of conductor 171⁶ will close on terminal of wire $a^6$— fixed on plate 153', so switching current onto wire c— and the relay El.4 from the wire $a^6$—.

Assuming that the terminals of wire $a^1$— (the terminals of wires $b^1$—, $a^1$, $b^1$, as explained, being in analogous positions) be spaced on bench 81, one from another at distances of 3.6° (Figs. 5, 14), the terminals of wire $a^2$— on bench 81² are spaced at arcs twice as great; the terminals of $a^3$— at arcs three times as great, and so on, in arithmetical progression, the terminals of wire $a^6$— being spaced at arcs six times as great, and those of $a^9$ at arcs nine times as great, as are the terminals of $a^1$—.

It is obvious that, if circuit be closed on wire $b^1$ at sales lever L (Fig. 13) and on wire $a^2$— at disk 156, the angular displacement of arm 78 will then be twice as great before circuit to relays El.4, El.4' be completed, as it would be, were circuit closed through wires $a^1$— and $b^1$. Similarly, if wire $b^3$, corresponding to the price three cents, be closed at sales lever, and the wire $a^6$—, corresponding to six packages, be closed at disk 156, the angular displacement of arms 78, 78' when completing circuit to relay El.4, will be 6×3, or eighteen times such displacement of arms 78, 78' as would correspond to a unit space displacement of audit wheel 45 (Fig. 3). The price conveyed to the audit wheels would be, accordingly, the product of six and three. Eight cents accordingly set up on audit wheel 45; and ten cents are totalized as a dime on audit wheel 45' through intersectional transmission. In like manner the number of units set up on the audit wheels 45, 45' (Fig. 3) will invariably be the product of the numerals which identify the b wires closed at a sales lever L, L', L" (Fig. 1) and the a— wire closed at disk 156 (Fig. 13).

Solenoid El.6 (Figs. 12, 13) which controls the latch 177 is in a circuit which originates at source ZZ and is conducted by wire s—, through contact plate 172 (Fig. 13) at disk 160 and bridge 32 at solenoid El.12a to solenoid El.12a, and thence flows through wire s+, back to source ZZ. This circuit is broken at contact-plate 172 by the initial displacement of the disk 160, in order that the latch 177 may descend on pawls 128²—128⁹; and remains broken at bridge 32 when solenoid El.12a retracts its plunger downwards, in order that the disk 156 may be retained in displaced position until completion of setting up the price. When the setting up of price has been completed, wire h to solenoid El.12a becomes inactive; the solenoid El.12a releases its plunger upwards through action of the spring 30 (Figs. 1, 9) and completes at bridge 32 (Fig. 13) the circuit to the solenoid El.6. This solenoid El.6 now energized, retracts its plunger and withdraws the latch 177 from the pawl 178⁶. Disk 156, so liberated, is restored, together with disk 13 (Figs. 1, 12), by spring 180 to zero, where key 158 encountering the notch 159, (Fig. 13) permits disk 160 to sink to its initial level.

The maximum price which may be established at purchase levers, if the apparatus be limited to cents and dimes, is ninety-nine cents. But accumulated sales may cause arm 50 (Fig. 3) to complete a revolution and reach zero. In order, therefore, that completion of such revolution may not close circuit through the contact plate 51 at terminals 191 and terminate the transaction without tender; the collar 190 (Fig. 3) supporting terminals 191 of wire n, is traversed by shaft 46''', which operates upon collar 190 by means of a screw-thread 192. The rotation of the shaft 46''' causes the collar 190 to travel laterally along the shaft 46''' and to carry the terminals 191 outward beyond reach of the contact plate 51, to the effect that arm 50 in revolving may pass through zero position under the influence of repeated sales without closing circuit at the terminals 191. The accumulation of sales may, in consequence thereof, be enlarged indefinitely, and an unlimited quantity of merchandise be purchased, before final tender; since the selling capacity of an apparatus—otherwise, $9.99, if it comprises sections only of the cent and dime,—is increased $10.00 in arithmetical progression by each convolution of the screw-thread 192.

*Selection of calculating units*

Inasmuch as convenience may require control-boards (Figs. 1, 2) in greater number than may ever be all in operation simultaneously, even at the peak of business; economy of apparatus may be effected, by means of a selector (Figs. 15, 16, 17, 18, 19, 20) capable of placing any particular control board (Figs. 1, 2) in connection with a calculating unit (Fig. 3) which may be disengaged. A number of control-boards or even sales establishments may thereby be served by calculating units banked at a common central station and actuated by a single motor in continued motion (Fig. 20).

When a sales lever (Fig. 1) is manipulated by a purchaser, and relay El.1 be deenergized, as hereintofore described, a circuit $p^3$ is closed by the plunger 24, at bridge 22. This is a pilot wire which operates on the selector only and does not extend to the calculating mechanism. (Fig. 3).

Referring to Figures 1 and 3, the control wires q, e, e', h, i, n etc. between a control board (Figs. 1, 2) and a calculating unit (Fig. 3) are individually shown. But inasmuch as such wires do not govern the operation of the selector, and are merely switched by the selector onto different calculating units, as presently described, these wires are represented in Figures 16, 17, 18, as severally carried and extended through cables, such as cables $x^1$, $xx^1$, $xxx^1$.

In Figure 15 is shown, in principle, the method of closing above wires onto their extensions. The relay El.30'' (Fig. 15) for example, momentarily energized, as presently explained, through wire $p^3$ closed at terminals 204'' by arm 203'' on rotating shaft 202, and held in stick, contracts its plunger, at the upper extremity of which is carried the bench 211, elongated, in view of clearness, and provided along its upper face with a series of contact plates such as contact plate 212. The contact plates 212 close, when the bench 211 be raised by the plunger of relay El.30'', the terminals 214 etc. of the wires connected to the fixed bench 213, onto the corresponding terminals of their extensions at the other edge of bench 213. The wire $p^3$ (Figs. 1, 15, 17 and 18) may, for purposes presently explained, be closed onto its extension at contact 215 to further switch-boards (Figs. 16, 17, 18). A relay, such as relay El.30'' (Fig. 15), together with benches 211, 213, is hereinafter referred to as a switch $S^1$, $S^2$, $S^3$ etc. (Fig. 16). The relay El.30'' shown in Figure 15 is typical of all the relays employed in the selector, although in subsequent figures the extensions of the wires are shown as running at right angles to the wires from which they are extended.

Referring to Figure 16, a series of control boards $CB^1$, $CB^2$—$CB^{16}$, such as are shown in detail (Figs. 1, 2) and heretofore described, are indicated with wires carried in cables to a series of calculating units $CU^1$, $CU^2$—$CU^{12}$, such as are shown in Figure 3 and heretofore described, there being sixteen such control boards represented, and twelve such calculating units. The cables $x^1$, $x^2$, $x^3$, $x^4$, from the several control boards of a group, as for example, control boards $CB^1$, $CB^2$, $CB^3$, $CB^4$ traverse horizontally the common switch-board $SB^1$, comprising switches $S^1$ to $S^{16}$, such as are in part shown more in detail in Figure 17, and the cable from each control board is connected with each switch which it so traverses, to the effect that the wires of each cable $x^1$, $x^2$, $x^3$, $x^4$ are capable of being closed onto the corresponding extension wires carried by any one of the perpendicular cables $xx^1$, $xx^2$, $xx^3$, $xx^4$. The arrangement is similar at all remaining switchboards.

The cables $xx^1$, $xx^2$, $xx^3$, $xx^4$ (Fig. 16) might, in principle lead directly to calculating units; but in order to indicate a wider distribution of circuits, an intermediate series of switchboards $SB^a$, $SB^b$, $SB^c$, $SB^d$, may conveniently be introduced. Figure 17 may be assumed to represent, for example, a number of switches S in the switch-board $SB^1$, Fig. 16 and Figure 18 a number of switches S in the switch-board $SB^b$, (Fig. 16).

Cable $xx^1$ (Fig. 16) is shown as leading to and traversing horizontally the highest series of switches at switch-board $SB^a$; cable $xx^2$, as leading to and traversing the highest series of switches at switch-board $SB^b$, cable $xx^3$, the highest at switch-board $SB^c$; and cable $xx^4$, the highest at switch-board $SB^d$. The cables from switch-boards $SB^2$, $SB^3$, $SB^4$ are similarly distributed through switch-boards $SB^a$, $SB^b$, $SB^c$, $SB^d$. All cables are capable of closing their wires on extensions at each switch which they traverse.

Traversing perpendicularly the switch-boards $SB^a$, $SB^b$, $SB^c$, $SB^d$, (Fig. 16) are for example, cables $xxx^1$, $xxx^{12}$ leading directly to the calculating units $CU^1$—$CU^{12}$, three calculating units receiving wires from four control boards through each switch-board $SB^a$, $SB^b$, $SB^c$, $SB^d$. Each control board $CB^1$—$CB^{16}$ may now close circuit to each calculating unit, but only one control board CB can be connected with one calculating unit CU at one time, as will presently appear. The number of control boards and the number of calculating units connected with a switch-board may be materially increased. In Figure 16 the pilot wires $p$, such as may be closed for example at contact 215 (Fig. 15), are supposedly carried in the $x$ cables to switch-boards $SB^1$, $SB^2$, $SB^3$, $SB^4$, and thence in the $xx$ cables to switch-boards $SB^a$, $SB^b$, $SB^c$, $SB^d$.

Having traced the various circuits from the control-board (Figs. 1, 2) to a multiple switch S, as shown in Figure 15, which may be represented as switch $S^{10}$ at the switch-board $SB^1$ (Fig. 16), let it be assumed that a sale be in operation at the control-board $CB^3$ which is wired to the switchboard $SB^1$, one of whose switches $S^{10}$ is represented in Figure 17.

In Figure 17 are shown the cables, for example $x^1$, $x^2$, $x^3$, from the control boards $CB^1$, $CB^2$, $CB^3$ with their respective pilot wires $p^1$, $p^2$, $p^3$ and extension cables $xx^1$, $xx^2$, $xx^3$, which will illustrate the manner of selection whether of further switch-boards or of calculating units. The problem now is, in closing the wires of cables onto their extensions, to prevent any one control-board from connecting with more than a single calculating unit, at a time; and to prevent more than one control-board from connecting, at a time, with the same calculating unit.

From motor M (Fig. 15) continued motion is transmitted through shaft 35', pinion 200 and wheel 201, to the shaft 202, on which are fixed at different levels and at different angles, the arms 203, 203', 203'', capable of closing circuit momentarily at terminals 204', 204'', 204''', as shown in Figure 15, or at groups of such terminals, as shown in Figure 17. The revolving arms 203', 203'', 203''' and the terminals at which circuits may thus be closed, are so spaced (Fig. 19) that no two circuits can be closed by the arms 203', 203'', 203''' onto the $p$ wires at exactly the same moment. Such a shaft 202, together with its revolving arms will be referred to as a contact shaft CS.

In Figure 17 nine switches of switchboard $SB^1$, (Fig. 16) for example, are shown, traversed at right angles by the cables $x^1$, $x^2$, $x^3$, (Fig. 17) and the cables $xx^1$, $xx^2$, $xx^3$. In Figure 18, which may represent, for example, nine switches S of the switch-board $SB^b$, (Fig. 16) the switches (Fig. 18) are shown without the cables and their benches. About the contact shaft $CS^1$ (Fig. 17) are grouped terminals of pilot wires $p^1$ from control board $CB^1$, $p^2$ from control-board $CB^2$ and $p^3$ from control board $CB^3$, which $p$ wires may close respectively circuits to the electros at the switches traversed by cables $x^1$, $x^2$, $x^3$ at switch-board $SB^1$ (Fig. 16). Assume that the control-board $CB^3$ in operation (Fig. 16) be, for purposes of illustration, the control-board shown in Figures 1, 2, that the several wires from this control-board are carried to switch-board $SB^1$ in the cable $x^3$ (Figs. 16 and 17), and that circuit through wire $p^3$ has momentarily been closed by arm 203'' (Figs. 15, 17) at terminals 204'' to relay El.30''. The circuit so closed originates at source ZZ (Fig. 3) and passes through wire $s+$, (Figs. 3, 15, 2, 1) wire $p^3$ (Fig. 1) bridge 22 at relay El.I, wire $p^3$ (Figs. 1, 15) bridge 205 at relay El.31''' (Figs. 15, 17) terminals 204'', closed momentarily by arm 203'', bridge 206', relay El.30'', bridge 208', wire $ss-$, bridge 210 at relay El.32'' and wire $s-$, (Figs. 15, 3) back to source ZZ (Fig. 3). Relay El.30'' (Figs. 15, 17) so energized contracts its plunger, closing circuits of cable $x^3$ onto cable $xx^2$ at the switch $S^{10}$ (Figs. 16, 17).

As relay El.30'' (Fig. 17) contracts its plunger, circuit is broken to its positive pole at bridge 206' and to its negative pole at bridge 208' but it is held in stick by supplementary wires $pp+$, $ss'-$ at bridges 207', 209'. At bridge 206' (Fig. 17) now raised, circuit is completed to the relay El.31''' which contracts its plunger and breaks circuit to terminals 204', 204'', 204''' preventing arms 203', 203''' from completing circuit to relays El.30', El.30''', and cable $x^3$ from being switched thereby onto cables $xx^1$ or $xx^3$. Hence cable $x^3$ cannot be closed, at the same time, upon more than one of cables $xx^1$, $xx^2$, $xx^3$.

At bridge 208', now raised, at relay El.30'' (Fig. 17), circuit is closed to the relay El.32'' which contracts its plunger and at its bridge 210 breaks circuit through the wire $ss$— which gave initial current to the negative pole of relay El.30'', and which is the initial negative supply wire to the relays at the other switches traversed by the cable $xx^2$ at the switch-board SB¹, as well. Such other relays are accordingly immobilized, preventing thereby, cables $x^1$ or $x^2$ from being switched onto cable $xx^2$. Cable $xx^2$ can not, accordingly, at the same time be engaged by more than one of the cables $x^1$, $x^2$, $x^3$.

Circuit is now closed from control board CB³ through cables $x^3$, $xx^2$ to switch-board SB^b (Fig. 16) at which cable $xx^2$ traverses and is connected, with the upper tier of switches. Contact shaft CS⁶, which may conveniently be rotated by motor M (Fig. 15) through supplementary shafting, not shown, closes the wire $p^3$ extended from switch-board SB¹ (Fig. 17), onto a relay, say relay 33''' (Fig. 18) at switch S²³ (Fig. 16). The operation which follows is similar to that effected at the electro El.30'', (Fig. 17) above described. At switch S²³ (Fig. 16) the wires carried by the cable $x^3$ from the control-board CB³ (Fig. 16) to the switch-board SB¹ and extended from the switch-board SB¹ through cable $xx^2$, are closed onto the wires of cable $xxx^4$ which complete circuits from the control-board CB³ to the calculating units CU⁴. The wires of cable $xx^2$ are prevented from closing on a second $xxx$ cable and the wires of other $xx$ cables from closing on the wires of $xxx^4$, in manner above described.

Experience would determine how many calculating units may normally be needed, to serve a given number of control boards. But the contingency might nevertheless arise, that a control board CB, be placed in operation, when all available calculating units are engaged. In such event, assuming that the control board CB³ (Fig. 16) be again employed in illustration, the wires of cable $x^3$ would still be switched at switch-board SB¹, onto the switchboard SB^a, SB^b, SB^c, or SB^d, inasmuch as there are at switch-board SB¹ as many $xx$ cables as there are cables $x$. The circuits so closed would be maintained at switch-board SB¹, and the completion of the circuits would merely be retarded, until an available $xxx$ cable to a calculating unit became free.

It will accordingly appear, that the deflection of a sales lever by a purchaser, at any control board, forthwith establishes connection with a switch-board, through which, immediately or with minimum delay, circuit is completed to one or another of an unlimited number of calculating units, being automatically directed to a calculating unit which happens to be disengaged. And whereas, any calculating unit of an entire sales system may be engaged by any control board, no control board can at a time, engage more than a single calculating unit; nor can any calculating unit be engaged, at the same time, by more than one control board. As a matter of convenience the number of control boards may, in consequence, be greater than the number of calculating units, economy in calculating units being thus effected. The calculating units may, moreover, be banked in large numbers at centres indefinitely remote from widely distributed control boards, facilitating, thereby, such technical supervision of the calculating units as may insure proper care.

Having now fully described my invention and its mode of operation, it will be apparent that many modifications may be made therein without departure from the essentials thereof and it is desired that the scope of the invention may only be limited by the following claims:

I claim:

1. In apparatus for vending variously priced merchandise, a container for each merchandise, a release to liberate the merchandise from the container, a lever to control each said release, an auxiliary release, a series of selective circuits corresponding to numerals of price, a contact settable upon each lever at an indicated point to close a selective circuit of said series, a circuit controller operative in opposite directions, a motor, electric means controlled by each lever to cause the motor to operate the controller in one direction, electric means controlled by the settable contact on the lever, to arrest the operation of the controller by the motor, when the controller be operated in degree proportionate to the numeral corresponding to the selected circuit, a denominational coin receiver, a circuit maker closed by a coin deposited in the receiver, means controlled by the circuit maker to cause the motor to operate the controller in opposite direction, means controlled by the circuit maker to arrest the operation of the controller by the motor when operated in degree proportionate to the value of the coin, and means rendered effective by the controller to operate the auxiliary release and deliver the vended merchandise, when the coin deposited satisfy the price.

2. In apparatus for vending variously priced merchandise and releasing change, a lever corresponding to each merchandise, a contact settable upon the lever to close a circuit corresponding to a selected price, a circuit controller operative in opposite directions comprising denominational contact wheels, a motor, electric means controlled by each lever to cause the motor to operate the controller from zero position in one direction, electric means controlled by the circuit closed by the settable contact to arrest the operation of the controller by the motor when operated in degree proportionate to the said selected price, a denominational coin receiver in which to deposit coin as payment, a circuit corresponding to the value of the coin, a circuit maker closed by coin deposited in the receiver, means controlled by the circuit maker to cause the motor to operate the controller through zero position in opposite direction, means controlled by the circuit maker including last said circuit to arrest the operation of the controller by the motor when the controller be operated in said opposite direction in degree proportionate to the value of the coin, denominational coin containers, coin releases for use in making change, means including circuits differentially closed by the contact wheels to cause the change release to liberate coin from the change containers corresponding in value to the excess of coin deposited as payment over the selected price, and means conditioned by the lever and rendered effective by the controller to release the vended merchandise when payment satisfy the price.

3. In apparatus for vending merchandise at a variable price and releasing coin as change, an electric change release, circuits to operate the change release, a circuit controller, a continuously running motor, a clutch to connect the controller with the motor, a circuit to energize the clutch, a lever, a denominational coin receiver in which to deposit coin, means controlled by the lever to close the circuit to the clutch and cause the motor to operate the controller from zero position in one direction, means controlled by the coin deposited in the receiver to operate the controller through zero position in opposite direction differentially to close said circuits to the change release, a series of selective circuits corresponding to different prices, a circuit breaker comprising a switch progressively operated by the motor and a relay variably controlled by the circuits of said series, and means settable upon the lever to close a selected circuit of said series and cause the said relay to break circuit to the clutch and arrest the operation of the controller in first said direction, when the controller be operated in degree proportionate to the price corresponding to the selected circuit.

4. In apparatus for vending a variety of merchandise at variable prices and releasing coin as change, a lever corresponding to each merchandise, a denominational coin receiver in which to deposit coin as payment, an electric change release, a circuit controller, a continuously running motor, an electric clutch to connect the controller with the motor, a circuit to energize the clutch, means controlled by a said lever to close the said circuit to the clutch and cause the motor to operate the controller in one direction from zero position, means controlled by coin deposited in the receiver to cause the motor to operate the controller in degree proportionate to the value of the coin, in opposite direction through zero position, differentially to actuate the change release, a container for each merchandise, a release corresponding to each container, an auxiliary release, a series of selective circuits common to all the levers corresponding to different prices, a settable member at each lever to close a selected circuit of said series corresponding to a selected price, a circuit breaker comprising a relay and a timing member operated by the motor to complete the selected circuit to the relay and break circuit to the clutch, when the controller be operated in first said direction in degree proportionate to the selected price, means controlled by the levers to liberate merchandise from the containers and means controlled by the controller to operate the auxiliary release and deliver the vended merchandise when the controller be operated in opposite direction proportionately to payment in degree to satisfy the selected price.

5. In apparatus for vending merchandise at a variable price involving different orders and for making change, an electric change release, a circuit controller comprising order elements, a continuously running motor, a lever comprising a plurality of circuit makers corresponding to respective order elements, a denominational coin receiver in which to deposit coin as payment, selective circuits corresponding to numerals of price, settable means at each circuit maker to close a selected circuit of said series corresponding to the numerals in corresponding orders of a price, means controlled by the circuit makers to cause the motor to operate the said order elements from zero position in one direction, and means controlled by coin deposited in the receiver to cause the motor to operate the order elements through zero position in opposite direction differentially to condition the change release, and means controlled by the circuit makers including the selected circuits of said series to arrest the operation of the respective order elements in first said direction when operated in degree proportionate to the numerals corresponding to the orders of the price.

6. In apparatus for vending merchandise at a variable price involving a plurality of numerals and for releasing coin as change, a lever, a change release, means including a circuit controller comprising a plurality of selective order elements operative from zero position in one direction and through zero position in opposite direction differentially to control the change release, a continuously running motor, a series of selective circuits corresponding to numerals of price, selective means at the lever to close circuits of said series corresponding to a selected price, means to select order elements corresponding to orders of the price, means rendered effective by the lever to cause the motor to operate the selected order elements in first said direction and means controlled by the lever including the selected circuits to arrest the operation of the respective order elements by the motor when operated in degree proportionate to the orders of the selected price, a denominational coin receiver in which to deposit coin as payment, a circuit corresponding to the value of the coin, means controlled by a coin deposited in the receiver to cause the motor to operate the order elements in opposite direction in degree proportionate to the value of the coin, and means conditioned by the lever and rendered effective by the controller to deliver the vended merchandise when the payment satisfy the price.

7. In apparatus for vending merchandise at a selected price, a lever, a circuit controller comprising order elements operative in reversible direction, a continuously running motor, a series of circuits corresponding to different prices, a contact member settable on the lever to close the circuit of said series corresponding to the selected price, means rendered effective by the lever to cause the motor to operate the order elements in one direction, means rendered effective by the contact member including the selected circuit to arrest the operation of the order elements, when the order elements be operated in degree proportionate to the selected price, a denominational coin receiver corresponding to a coin comprising dual orders, a circuit maker operated by a coin deposited in the receiver, circuits closed by the circuit makers corresponding to respective order elements and to the orders component in the value of the coin, means including last said circuits to arrest the said order elements, when operated respectively in contributive degrees proportionate to the value of the coin, and means conditioned by the lever and rendered effective by the controller to deliver the vended merchandise when the coin deposited in the receiver satisfy the selected price.

8. In apparatus for vending a variety of merchandise, and for releasing coin as change, a change release, a circuit controller, a continuously running motor normally disconnected from the controller, a lever corresponding to each merchandise, means controlled by each lever to connect the circuit controller with the motor, a series of selective circuits common to all levers corresponding to numerals of price, a contact at each lever to close a selected circuit of said series, means controlled by the lever including the said selected circuit, to disconnect the controller from the motor, when the controller be operated in degree proportionate to the price corresponding to the selected circuit, a denominational coin receiver, means controlled by coin deposited in the receiver to connect the controller with the motor and operate the controller to or through zero in opposite direction to condition the change release, means controlled by the coin including a circuit corresponding to the value of the coin to disconnect the controller from the motor when operative in degree proportionate to the said value, means conditioned by the lever and rendered effective by the controller to deliver the vended merchandise when the value of coin deposited in the receiver satisfy the selected price.

9. In coin controlled vending apparatus for making change, a change release, means including circuits to operate the change release, a circuit controller operative from zero position in one direction and operative through zero position in opposite direction, differentially to condition the said circuits, a continuously running motor, a clutch to connect the controller with the motor, a lever, means controlled by the lever to energize the clutch and cause the motor to operate the controller from zero in first said direction, and means controlled by the lever to de-energize the clutch, a denominational coin receiver, a circuit maker operated by a coin inserted in the receiver, circuits closed by the circuit maker to energize the clutch and cause the motor to operate the controller in opposite direction, and means controlled by the circuit maker to de-energize the clutch and arrest the operation of the controller by the motor, when operated in degree proportionate to the value of the inserted coin.

10. In a coin controlled vending apparatus for making change, a change release, means including a circuit controller operative from zero position in one direction and through zero position in opposite direction differentially to control the change release, a lever, a circuit corresponding to a numeral of price, means controlled by the lever, including the said circuit, to operate the controller in first said direction in degree proportionate to said numeral, a denominational coin receiver in which to deposit coin as payment in value greater than the numeral of price, a circuit corresponding to the value of the coin and means controlled by the said coin to operate the controller through zero position in opposite direction in degree proportionate to the value of the coin in excess of the numeral of price.

11. In apparatus for vending merchandise and releasing coin as change, a circuit controller, a change release, a continuously running motor, an electric clutch to connect the controller with the motor, an electric circuit to energize the clutch, a control lever to close the circuit and cause the motor to operate the controller in one direction, a circuit breaker, a series of normally open selective circuits to the circuit breaker each corresponding to a price, a contact member settable at indicated positions and rendered effective by the lever to close a selected circuit of said series, a timing member continuously operated by the motor, means including the timing member to complete the selected circuit to the circuit breaker and break the circuit to the clutch, a denominational coin receiver in which to deposit coin as payment, a circuit corresponding to the value of the coin, means controlled by the coin, including the clutch and last said circuit to cause the motor to operate the controller to or through zero position in opposite direction proportionately to the value of the coin, means controlled by the controller, including the release to liberate change in value proportionate to the excess degree the controller be operated in last said direction over the degree it be operated in the first.

12. In apparatus for vending a merchandise in selected variable quantities, a merchandise container, a merchandise release, a lever, means under control of the lever to operate the said release, an auxiliary release, a circuit controller, a continuously running motor, an electric clutch to connect the controller with the motor, means controlled by the lever including an electric circuit to energize the clutch, a series of selective circuits corresponding to different prices, a settable member to close a selected circuit of said series corresponding to the price of a unit quantity of merchandise, a settable dial, multiplying means controlled by the dial to cause the release to liberate merchandise from the container in selective multiples of the unit quantity at a single manipulation of the lever, a circuit breaker controlled by the selected circuit to break the circuit to the clutch, means controlled by the dial including a progressively movable switch continuously operated by the motor, to vary the operation of the circuit breaker and cause the clutch to disconnect the controller from the motor, when the controller be operated in degree proportionate to the corresponding multiple of the unit price, a denominational coin receiver in which to deposit coin as payment, a circuit corresponding to the value of the coin, means controlled by a coin deposited in the receiver including last said circuit to cause the motor to operate the controller in opposite direction in degree proportionate to the value of the coin, and means controlled by the controller to operate the auxiliary release and deliver the vended merchandise when the coin deposited as payment satisfy said multiple of price.

13. In apparatus for vending selective quantities of merchandise, a merchandise container, a merchandise release, a lever, means controlled by the lever to operate the release, an auxiliary release, a circuit controller, a continuously running motor, a circuit corresponding to the price of a unit quantity of merchandise, means controlled by the lever including said circuit, to cause the motor to operate the controller in degree proportionate to the said price, a settable dial, multiplying means controlled by the dial to cause the release to liberate merchandise from the container in selected multiples of the unit quantity at a single operation of the lever, means controlled by said dial to vary the operation of the controller by the motor in degree proportionate to the corresponding multiple of the unit price, a denominational coin receiver in which to deposit coin as payment, a circuit corresponding to the value of the coin, means controlled by the coin including last said circuit to cause the motor to operate the controller in degree proportionate to the value of the coin, and means controlled by the controller to operate the auxiliary release and deliver the vended merchandise when the coin deposited in payment satisfy said multiple of price.

14. In apparatus for vending variably priced merchandise and for making change, a change release, a merchandise container, a lever, a series of selective circuits corresponding to different prices, settable means to close a selected circuit of said series corresponding to the price of merchandise, means including circuits and a circuit controller to control the change release, means to operate the controller from zero position in one direction and means to operate the controller through zero position in opposite direction differentially to close the last said circuits, means controlled by the lever including the selected circuit to arrest the operation of the controller by the motor when operated in first said direction in degree proportionate to the price corresponding to the selected circuit, a denominational coin receiver in which to deposit coin as payment, a circuit corresponding to the value of the coin, means controlled by the coin including last said circuit to arrest the operation of the controller when operated in last said direction in degree proportionate to the value of the coin, means controlled by the lever to release merchandise from the container, an auxiliary release, and means controlled by the controller to operate the auxiliary release and deliver the vended merchandise when payment satisfy the price corresponding to the selected circuit.

15. In vending apparatus, a lever, a circuit corresponding to the price of merchandise, a denominational coin receiver in which to deposit coin as payment, a circuit corresponding to the value of the coin, a circuit controller, means under control of the lever including the circuit corresponding to the price, to operate the controller in degree proportionate to the said price, means controlled by the coin deposited in the receiver including the circuit corresponding to its denominational value, to operate the controller in degree proportionate to the value of the coin, a reversible screw-threaded shaft, a revolving contact member fixed upon the shaft, and a complementary contact member mounted on the screw thread, zero setting means, an electric circuit normally closed at the said contact members to control the zero setting means, means controlled by the controller to rotate the shaft in one direction and cause the screw thread to separate the complementary member laterally from the other member in measure proportioned to the price as the other member be revolved, means controlled by the controller to rotate the shaft in opposite direction and cause the complementary member to approach said other member in measure proportioned to the coin deposited as payment, to close said circuit to the zero setting means, when payment equal price, and means conditioned by the lever and rendered effective by the zero setting means, to deliver the vended merchandise when payment satisfy the price.

16. In apparatus for cumulative vending, a lever, a circuit corresponding to the price of merchandise, a denominational coin receiver in which to deposit coin as payment, a circuit controller, means controlled by the lever including the circuit corresponding to the price to operate the controller successively in one direction in degree proportionate to the cumulative price, means controlled by coin deposited in the receiver including a circuit corresponding to its denominational value to operate the controller in opposite direction in degree proportionate to payment, a reversible screw-threaded shaft, a revolving contact member fixed upon the shaft, and a complementary contact member mounted on the screw thread, zero setting means, an electric circuit normally closed at said contact members to control the zero setting means, means controlled by the controller to rotate the shaft in one direction and cause the screw-thread to separate the complementary member laterally from the other member in measure proportioned to the cumulative price as the other member be revolved, and permit said other member to pass through zero position in successive revolutions without closing said circuit to the zero setting means, and means conditioned by the lever and rendered effective by the zero setting means to deliver the vended merchandise when payment satisfy the cumulative price.

17. In apparatus for cumulative vending, a lever, a circuit corresponding to the price of merchandise, a denominational coin receiver in which to deposit coin as payment, a circuit controller, means controlled by the lever including the circuit corresponding to the price successively to operate the controller in degree proportionate to the cumulative price, means controlled by the coin deposited in the receiver including a circuit corresponding to its denominational value, to operate the controller in opposite direction in degree proportionate to payment, a reversible screw-threaded shaft, a revolving contact member fixed upon the shaft and a complementary contact member mounted on the screw thread, zero setting means, means controlled by the controller to rotate the shaft in one direction and cause the screw thread to separate the complementary member laterally from said other member in measure proportioned to the cumulative price, as said other member be revolved and permit cumulative vending during successive revolution of said other member, without closing closing circuit to said zero setting means, and means conditioned by the lever and rendered effective by the zero-setting means to deliver the vended merchandise when payment satisfy the cumulative price.

18. In vending apparatus, a lever, a denominational coin receiver in which to deposit coin as payment, a circuit corresponding to the price of merchandise, a circuit corresponding to the value of the coin, a circuit controller provided with a rotary contact member and a complementary contact member movable from and towards the orbit of said other member, as said other member be revolved, zero setting means, an electric circuit normally closed at said contact members to operate the zero setting means, means controlled by the lever including the circuit corresponding to the price to separate the complementary member from the orbit of said other member in measure proportioned to the price, means controlled by a coin deposited in the receiver including the circuit corresponding to its denominational value, to cause the complementary member to approach the orbit of said other member in measure proportioned to the value of the coin to close said circuit to the zero setting means when payment equal price, and means conditioned by the lever and rendered effective by the zero setting means to deliver the vended merchandise when payment satisfy the price.

19. In vending apparatus, a lever, a circuit corresponding to a price of merchandise, a denominational coin receiver in which to deposit coin as payment, a circuit corresponding to the value of the coin, a circuit controller, means controlled by the lever including the circuit corresponding to price to operate the controller in one direction in degree proportionate to price, means controlled by the coin deposited in the receiver including the circuit corresponding to its denominational value to operate the controller in opposite direction in degree proportionate to the value of the coin, a contact member and a complementary contact member each movable from and towards one another in intersecting planes, zero setting mechanism, an electric circuit normally closed at the said contact members to operate the zero setting mechanism, means controlled by the controller to separate the complementary member from the other contact member as said other member be moved under control of the lever in its respective plane, means under control of the controller to cause the complementary member to approach said other member in measure proportioned to the value of coin deposited in the receiver, to close said circuit to the zero setting mechanism when coin be deposited in the receiver in value equal to the price and means conditioned by the lever and rendered effective by the zero setting mechanism to deliver the vended merchandise when payment satisfy the price.

20. In apparatus for vending various classes of merchandise, a plurality of control levers respectively to select the different merchandise, a numeral circuit closed by each lever corresponding to a respective price, a plurality of denominational coin receivers in which to deposit coin as payment, denominational circuits corresponding to the value of the respective coins, a circuit maker at each receiver operated by a coin deposited in the receiver to close a last said circuit, a circuit controller operative in opposite directions, a continuously running motor, means under control of the lever including a said numeral circuit to operate the controller in degree proportionate to price, means under control of coin deposited in a receiver including a said denominational circuit, to cause the motor to operate the controller in opposite direction in degree proportionate to the value of said coin, zero setting mechanism operative when the value of the coin deposited equal a said price, merchandise containers, a merchandise release for each container, a receptacle common to the different merchandise, an auxiliary release, means controlled by the levers to cause the releases to release respective merchandise from the containers, and means controlled by the zero setting mechanism to operate the auxiliary release to deliver the merchandise from the receptacle at a common point.

21. In apparatus for vending variously priced merchandise, levers respectively to select the different merchandise, a numeral circuit closed by each lever corresponding to the respective price, a plurality of denominational coin receivers in which to deposit coin as payment, denominational circuits, a circuit maker at each receiver operated by a coin deposited in the receiver to close a last said circuit corresponding to the valve of the coin, a circuit controller, a continuously running motor, means under control of each lever including a respective numeral circuit to cause the motor to operate the controller in one direction in degree proportionate to the price of the selected merchandise, means under control of coin deposited in a receiver including the respective denominational circuit to cause the motor to operate the controller in opposite direction in degree proportionate to the value of the coin, zero setting mechanism under control of the circuit controller normally active when the value of coin deposited as payment equal a corresponding price, means including a relay to retard the operation of the zero setting mechanism, in the event coin in excess be deposited, until the controller be operated in full degree proportionate to the value of the said excess, a plurality of denominational coin containers, a change release for each container, change release contacts operated by the circuit controller and effective in degree proportionate to the excess value of coin deposited in the receivers over price, an electric circuit closed by the zero setting mechanism and completed by said contacts to cause the releases to release change corresponding to the value of the said excess, and means conditioned by each lever and rendered effective by the zero setting mechanism to deliver the selected merchandise when payment satisfy the price.

22. In apparatus for the cumulative vending of variously priced merchandise at a cumulative price, a container for each merchandise, a plurality of levers, a numeral circuit closed by each lever corresponding to a respective price, denominational coin receivers, denominational circuits, a circuit maker at each receiver operated by a coin deposited in the receiver to close a last said circuit corresponding to the value of the coin, means under control of the levers including respective numeral circuits to operate the controller in one direction in degree proportionate to the cumulative price of the selected merchandise, means under control of coin deposited in the receivers including respective denominational circuits to operate the controller in opposite direction in degree proportionate to the deposited coin, coin containers, change releases, zero setting mechanism, means under the conjoint control of the zero setting mechanism and the controller to cause the releases to liberate coin from the coin containers corresponding to the excess of coin deposited in the receivers over the cumulative price, means controlled by the lever to release merchandise from the containers, an auxiliary release, and means controlled by the zero setting mechanism to operate the auxiliary release and deliver the vended merchandise when payment satisfy the cumulative price.

23. In apparatus for cumulative vending of a variety of merchandise, control levers, merchandise releases controlled each by said lever, a numeral circuit closed by each lever corresponding to the price of a respective merchandise, a plurality of denominational coin receivers, denominational circuits, a circuit maker at each receiver closed by a coin deposited in the receiver to close a last said circuit corresponding to the value of the coin, means under control of the levers including said respective numeral circuits to operate the controller in one direction in degree proportionate to the cumulative price, means under control of the coin deposited in the receivers including the respective denominational circuits closed by the circuit maker, to operate the controller in opposite direction in degree proportionate to the value of the coin, change containers, change releases, merchandise containers, zero setting mechanism, means under the conjoint control of the zero setting mechanism and the controller to cause the change releases to liberate change from the change containers in value corresponding to the excess of coin deposited over the cumulative price, means under control of the levers to cause the merchandise release to liberate the selected merchandise from the respective containers, an auxiliary release and means under control of the zero setting mechanism to operate the said auxiliary release and deliver the change and merchandise at a common point.

24. In apparatus for the cumulative vending of a merchandise at a cumulative price and for making change, a lever, a numeral circuit corresponding to the price of a unit quantity of said merchandise, an electrically controlled change release, a circuit controller operative from zero position in one direction and through zero position in opposite direction differentially to condition the change release, means controlled by the lever including the said numeral circuits to operate the controller from zero position in first said direction in degree proportionate to the unit price at each manipulation of the lever, a denominational coin receiver in which to deposit coin as payment, a denominational circuit corresponding to the value of the coin, means controlled by coin deposited as payment including said denominational circuit to operate the controller to and through zero in opposite direction in degree proportionate to the value of the coin, zero setting mechanism, means under conjoint control of the zero setting mechanism and the controller to cause the change release to release change proportionate in value to the degree in which the controller pass through zero position, and means conditioned by the lever and rendered effective by the zero setting mechanism to deliver the vended merchandise when payment satisfy the cumulative price.

25. In apparatus for vending variously priced merchandise and for releasing coin as change, an electric change release, a lever to select each merchandise, a numeral circuit controlled by each said lever corresponding to the price of a respective merchandise, a circuit controller, a plurality of denominational coin receivers in which to deposit coin as payment, a circuit marker at each receiver closed by a coin deposited in the receiver, a circuit closed by each circuit marker corresponding to the value of the coin, means controlled by each lever including the respective numeral circuit to operate the controller from zero in one direction, means under control of coin deposited in the receiver including the circuit closed by the circuit maker, to operate the controller to and through zero in opposite direction differentially to condition the change release, zero setting mechanism controlled by the controller including a threaded shaft, contacts and an electric circuit, to clear the controller, if the value of coin deposited as payment exceed the price of the selected merchandise, and means conditioned by the lever and rendered effective by the zero setting mechanism to deliver the selected merchandise when payment satisfy the respective price.

26. In an automatic sales system, a plurality of control boards at which to purchase merchandise, each provided with a lever, control circuits controlled by the lever, including a circuit corresponding to the price of merchandise, a denominational coin receiver in which to deposit coin as payment, and control circuits under control of a said coin including a circuit corresponding to the value of the coin, a plurality of normally disconnected circuit controllers each operative in respective opposite directions under control of a said lever and of coin deposited as payment in degrees respectively proportionate to the said price and to the value of said coin, a continuously running motor, means including circuits connected with each controller to connect the controller with the motor, extensions connected with each controller intersecting extensions of the control circuits of all control boards, a relay at each intersection, electric pilot wires, one at each control board, controlled by a said lever to close circuit to the relays at the intersections of the extensions related to the board, a continuously revolving contact member operated by the motor serially to complete the circuits of the respective pilot wires to their related relays and cause the extensions of each operated control board to be connected with the extensions to a circuit controller which be disconnected, means controlled by each said relay to block connection of a control board with more than one controller and connection of a controller with more than one control board, and means conditioned by the lever and rendered effective by the controller to deliver the purchased merchandise when payment satisfy the respective price.

27. In an automatic sales system, a plurality of control boards at which to purchase merchandise each provided with a lever, control circuits controlled by the lever including a circuit corresponding to a price, a denominational coin receiver in which to deposit coin as payment, and control circuits under control of said coin including a circuit corresponding to the value of the coin, a plurality of normally disconnected circuit controllers each operative in opposite directions under control respectively of a said lever and of coin deposited at a control board, in degrees respectively proportionate to a said price and to the value of said coin, extensions of said control circuits normally open, intersecting extensions of said control circuits from all control boards, a contact member, means including relays, one at each intersection, serially controlled by said contact member to connect each operated control board singly with a controller which be disconnected, and means conditioned by the lever at the control board and rendered effective by the controller to deliver the purchased merchandise when payment satisfy the respective price.

28. In an automatic sales system a plurality of control boards at which to purchase merchandise, each provided with a lever, control circuits controlled by the lever including a circuit corresponding to a price, a denominational coin receiver in which to deposit coin as payment and control circuits controlled by the said coin including a circuit corresponding to the value of the coin, a plurality of normally disconnected circuit controllers less numerous than the control boards, each operated in respective opposite directions by means including the circuits under control of a said lever and of coin deposited at the control board in degrees respectively proportionate to a said price and to the value of said coin, means automatically to disconnect a controller connected with a control board, when the controller be operated under control of the coin deposited as payment in degree proportionate to the corresponding price, extensions of said control circuits from each control board intersecting the said control circuits of all control boards, means including a revolving contact member and relays, one relay at each said intersection, serially controlled by said contact member, to connect the control circuits of each operated control board with extensions at a said intersection, circuits connected with each circuit controller intersecting all said extensions, means including an auxiliary revolving contact member and other relays, one at each of last said intersections, serially controlled by last said contact member, to effect retarded connection of an operated control board with a disconnected controller, if at the initiation of the operation all controllers be connected, and means conditioned by the lever and rendered effective by the controller to deliver the purchased merchandise when payment satisfy the respective price.

29. In an automatic sales system, a plurality of control boards at which to purchase merchandise each comprising a lever, control circuits controlled by the lever including a circuit corresponding to a price, a denominational coin receiver in which to deposit coin as payment, and control circuits controlled by the said coin including a circuit corresponding to the value of the coin, a plurality of circuit controllers less numerous than the control boards, each operative in respective opposite directions by means including said circuits under control of a said lever and of a coin deposited at the control board, in degrees respectively proportionate to a said price and to the value of the coin, means automatically to disconnect a connected controller from a control board when the controller be operated under control of coin deposited as payment in degree proportionate to corresponding price, circuits connected with each controller, contact members, relays serially controlled by said contact members, means including said contact members and said relays to connect the control circuits of an operated control board with the circuits of a disconnected controller, means, if no controller be disconnected, to effect retarded connection of the operated control board with a controller, when a controller becomes disconnected, and means conditioned by the lever and rendered effective by the controller to deliver the purchased merchandise when payment satisfy the respective price.

30. In an automatic sales system, a plurality of control boards at which to purchase merchandise each comprising a lever, and a denominational coin receiver provided with a switch operated by a coin deposited as payment in receiver, electric circuits closed by the lever including a circuit corresponding to the price of merchandise, electric circuits closed by the switch including a circuit corresponding to the value of said coin, a plurality of circuit controllers normally disconnected from the control boards, means to connect any one control board with one disconnected controller, means to operate the controller under control of the circuits closed at the control board in respective opposite directions in degrees proportionate respectively to said price of merchandise and to the value of the coin, and means conditioned by the lever and rendered effective by the controller to deliver the purchased merchandise when the value of the coin deposited in the receiver satisfy the respective price.

31. In an automatic sales system, a plurality of control boards at which to purchase merchandise, each comprising a lever and a denominational coin receiver in which to deposit coin as payment, a single series of circuits common to all control boards corresponding to values of price and payment, a plurality of circuit controllers, means controlled by the lever at each control board including a circuit of said series corresponding to the price of merchandise to operate a said controller in one direction in degree proportionate to the said price, means controlled by the coin deposited in the receiver at each control board including a circuit of said series corresponding to the value of the coin to operate said controller in opposite direction in degree proportionate to the value of the coin, means conditioned by the lever and rendered effective by the controller to deliver the merchandise purchased at each respective control board when payment satisfy the respective price, and means including a continuously running motor and a pair of contact members continuously revolved by the motor for differentially controlling the circuits of said series, to operate a plurality of the controllers in simultaneous sales involving the same or a variety of values in the price and in the coin deposited in the receivers.

32. In an automatic sales system, a plurality of control boards at which to purchase merchandise, each comprising a lever and a denominational coin receiver in which to deposit coin as payment, at each control board, a single series of circuits corresponding to numerals of price and payment common to all control boards, a plurality of circuit controllers, means controlled by the lever at each control board including a circuit of said series corresponding to the price of the respective merchandise to operate a controller in one direction in degree proportionate to the said price, means controlled by the coin deposited as payment including a circuit of said series corresponding to the value of the coin to operate the said controller in opposite direction in degree proportionate to the coin deposited as payment, means conditioned by the lever and rendered effective by the controller to deliver the merchandise purchased at each respective control board when payment satisfy the respective price, and means, including a contact member for differentially controlling the said circuits, to operate the controllers in simultaneous or overlapping sales involving the same or a variety of price and payment.

HENRY JEWETT FURBER.